US008774970B2

(12) United States Patent
Knopow et al.

(10) Patent No.: US 8,774,970 B2
(45) Date of Patent: Jul. 8, 2014

(54) TRAINABLE MULTI-MODE FLOOR CLEANING DEVICE

(75) Inventors: Jeremy F. Knopow, Burlington, WI (US); David Curtis, Sunnyvale, CA (US); Everett F. Carter, Jr., Monterey, CA (US); Ted Larson, Los Altos, CA (US); Bob Allen, Ben Lomond, CA (US)

(73) Assignee: S.C. Johnson & Son, Inc., Racine, WI (US)

( * ) Notice: Subject to any disclaimer, the term of this patent is extended or adjusted under 35 U.S.C. 154(b) by 597 days.

(21) Appl. No.: 12/813,717

(22) Filed: Jun. 11, 2010

(65) Prior Publication Data

US 2011/0004342 A1 Jan. 6, 2011

Related U.S. Application Data

(60) Provisional application No. 61/186,222, filed on Jun. 11, 2009.

(51) Int. Cl.
*G05B 19/18* (2006.01)
*G05D 1/02* (2006.01)
*A47L 5/28* (2006.01)
*G05B 15/02* (2006.01)

(52) U.S. Cl.
CPC ............ *G05D 1/0272* (2013.01); *G05D 1/0242* (2013.01); *A47L 5/28* (2013.01); *G05D 2201/0203* (2013.01); *G05D 1/0255* (2013.01); *G05D 1/0221* (2013.01); *G05B 2219/45098* (2013.01); *G05B 15/02* (2013.01); *G05D 1/0225* (2013.01); *A47L 2201/04* (2013.01)
USPC .................. 700/253; 700/245; 701/1; 15/42; 15/83; 15/98; 15/319; 15/320; 15/325; 15/331; 15/339; 15/353; 15/385; 340/540; 422/5; 55/345

(58) Field of Classification Search
CPC ............ G05B 19/18; A47L 5/10; A47L 5/00; A47L 11/34; A47L 5/30; A47L 9/16; A47L 11/33; A47L 11/40; A47L 9/28; A47L 9/04; A47L 7/00; E01H 1/04; G08B 21/00; A61L 9/04; A61L 9/12; A61L 2/00; G06F 19/00; G06F 7/00; B62D 11/04; G01J 1/44; H01J 40/14; B01D 45/12
USPC ............... 700/245; 701/1; 15/42, 83, 98, 319, 15/320, 325, 331, 339, 353, 385; 340/540; 422/5; 55/345
See application file for complete search history.

(56) References Cited

U.S. PATENT DOCUMENTS

| 848,974 | A | 4/1907 | Crossman |
| 2,227,104 | A | 12/1940 | Parker |

(Continued)

FOREIGN PATENT DOCUMENTS

| CA | 2531305 | 10/2006 |
| DE | 19521358 | 9/1996 |

(Continued)

OTHER PUBLICATIONS

Svetlana Domnitecheva: "Smart Vacuum Cleaner—An Autonomous Location-Aware Cleaning Device" International Conference on Ubiquitous Computing (Online) Sep. 10, 2004 Nottingham, England Retrieved from the Internet: URL:http://ubicomp.org/ubicomp2004/adjunct/posters/domnitch.pdf.

(Continued)

*Primary Examiner* — James Trammell
*Assistant Examiner* — Sanjeev Malhotra

(57) ABSTRACT

A floor cleaning device that is manually trainable for subsequent automatic operation. Prior to automatic operation, a user trains the cleaning device by manually manipulating the device through one or more desired cleaning paths. After training of the device, the device is configured to automatically initiate subsequent cleaning operations in accordance with the trained routine(s). Preferably, the training routine includes user specification of one of a number of cleaning modalities that are supported by the flooring cleaning device. In addition to automatic navigation, the floor cleaning device is configured to initiate a desired cleaning modality as a function of the device's position with respect to one or more of the trained routine(s).

11 Claims, 12 Drawing Sheets

(56) References Cited

U.S. PATENT DOCUMENTS

| | | | | |
|---|---|---|---|---|
| 2,243,935 | A | 6/1941 | Williamson | |
| 2,407,408 | A | 9/1946 | Erickson | |
| 2,476,537 | A | 7/1947 | Erickson | |
| 2,483,169 | A | 9/1949 | Anderson | |
| 2,506,077 | A | 5/1950 | Goldsmith | |
| 2,584,515 | A | 2/1952 | Udell | |
| 2,655,680 | A | 10/1953 | Geerin | |
| 2,960,714 | A | 11/1960 | Senne | |
| 2,963,731 | A | 12/1960 | Hoots | |
| 4,305,176 | A * | 12/1981 | Lessig et al. | 15/325 |
| 4,881,288 | A * | 11/1989 | May et al. | 15/98 |
| 5,074,008 | A | 12/1991 | Palomino, Jr. | |
| 5,077,863 | A | 1/1992 | Rench | |
| 5,109,566 | A | 5/1992 | Kobayashi et al. | |
| 5,127,123 | A | 7/1992 | Belanger | |
| 5,165,064 | A | 11/1992 | Mattaboni | |
| 5,203,047 | A | 4/1993 | Lynn | |
| 5,214,822 | A | 6/1993 | Sakurai et al. | |
| 5,279,672 | A | 1/1994 | Betker et al. | |
| 5,292,582 | A | 3/1994 | Gibbs et al. | |
| 5,293,955 | A | 3/1994 | Lee | |
| 5,297,311 | A | 3/1994 | Puri | |
| 5,309,592 | A | 5/1994 | Hiratsuka | |
| 5,327,609 | A | 7/1994 | Bierma et al. | |
| 5,341,540 | A * | 8/1994 | Soupert et al. | 15/319 |
| 5,399,381 | A | 3/1995 | Randall | |
| 5,440,216 | A | 8/1995 | Kim | |
| 5,454,129 | A | 10/1995 | Kell | |
| 5,594,971 | A | 1/1997 | Nelson | |
| 5,613,261 | A | 3/1997 | Kawakami et al. | |
| 5,621,291 | A | 4/1997 | Lee | |
| 5,634,237 | A * | 6/1997 | Paranjpe | 15/319 |
| 5,636,402 | A | 6/1997 | Kubo et al. | |
| 5,643,047 | A | 7/1997 | Beckett et al. | |
| 5,646,494 | A | 7/1997 | Han | |
| 5,682,313 | A | 10/1997 | Edlund et al. | |
| 5,720,077 | A | 2/1998 | Nakamura et al. | |
| 5,735,959 | A | 4/1998 | Kubo et al. | |
| 5,815,880 | A | 10/1998 | Nakanishi | |
| 5,825,981 | A | 10/1998 | Matsuda | |
| 5,883,582 | A | 3/1999 | Bowers et al. | |
| 5,894,621 | A | 4/1999 | Kubo | |
| 5,896,611 | A | 4/1999 | Haaga | |
| 5,933,900 | A | 8/1999 | Wang | |
| 5,935,179 | A | 8/1999 | Kleiner et al. | |
| 5,940,928 | A | 8/1999 | Erko | |
| 5,947,225 | A | 9/1999 | Kawakami et al. | |
| 5,974,626 | A | 11/1999 | Wood et al. | |
| 5,991,951 | A | 11/1999 | Kubo et al. | |
| 5,995,884 | A | 11/1999 | Allen et al. | |
| 5,996,167 | A | 12/1999 | Close | |
| 5,998,953 | A | 12/1999 | Nakamura et al. | |
| 6,012,618 | A | 1/2000 | Matsuo | |
| 6,046,565 | A | 4/2000 | Thome | |
| 6,049,745 | A | 4/2000 | Douglas et al. | |
| 6,088,873 | A * | 7/2000 | Pacchini et al. | 15/320 |
| 6,099,091 | A | 8/2000 | Campbell | |
| 6,102,278 | A | 8/2000 | Rothas | |
| 6,105,192 | A | 8/2000 | Deiterman et al. | |
| 6,112,996 | A | 9/2000 | Matsuo | |
| 6,124,694 | A | 9/2000 | Bancroft et al. | |
| 6,138,063 | A | 10/2000 | Himeda | |
| 6,142,252 | A | 11/2000 | Kinto et al. | |
| 2,352,486 | A | 1/2001 | Burlington | |
| 6,170,740 | B1 | 1/2001 | Clark | |
| 6,199,610 | B1 | 3/2001 | Yanagawa | |
| 6,212,725 | B1 | 4/2001 | Porat | |
| 6,223,378 | B1 | 5/2001 | Watellier | |
| 6,255,793 | B1 | 7/2001 | Peless et al. | |
| 6,295,687 | B1 | 10/2001 | Dehart | |
| 6,301,738 | B1 | 10/2001 | Deiterman et al. | |
| 6,311,356 | B1 | 11/2001 | Wang | |
| 6,324,714 | B1 | 12/2001 | Walz et al. | |
| 6,338,013 | B1 | 1/2002 | Ruffner | |
| 6,346,884 | B1 | 2/2002 | Uozumi et al. | |
| 6,370,452 | B1 | 4/2002 | Pifster | |
| 6,453,223 | B1 | 9/2002 | Kelly et al. | |
| 6,459,955 | B1 * | 10/2002 | Bartsch et al. | 700/245 |
| 6,459,966 | B2 | 10/2002 | Nakano et al. | |
| 6,463,360 | B1 | 10/2002 | Terada et al. | |
| 6,481,515 | B1 | 11/2002 | Kirkpatrick et al. | |
| 6,532,404 | B2 | 3/2003 | Colens | |
| 6,532,619 | B2 | 3/2003 | Kasper et al. | |
| 6,548,982 | B1 | 4/2003 | Papanikolopoulos et al. | |
| 6,571,415 | B2 | 6/2003 | Gerbert et al. | |
| 6,574,549 | B2 | 6/2003 | Cato et al. | |
| 6,591,216 | B1 | 7/2003 | Magnussen | |
| 6,594,844 | B2 | 7/2003 | Jones | |
| 6,599,844 | B2 | 7/2003 | Koh et al. | |
| 6,601,265 | B1 | 8/2003 | Burlington | |
| 6,611,738 | B2 | 8/2003 | Ruffner | |
| 6,622,088 | B2 | 9/2003 | Hood | |
| 6,633,150 | B1 | 10/2003 | Wallach et al. | |
| 6,658,325 | B2 | 12/2003 | Zweig | |
| 6,667,592 | B2 | 12/2003 | Jacobs et al. | |
| 6,671,592 | B1 | 12/2003 | Bisset et al. | |
| 6,690,134 | B1 | 2/2004 | Jones et al. | |
| 6,705,522 | B2 | 3/2004 | Gershman et al. | |
| 6,741,054 | B2 | 5/2004 | Koselka et al. | |
| 6,764,373 | B1 | 7/2004 | Osawa et al. | |
| 6,779,217 | B2 | 8/2004 | Fisher | |
| 6,809,490 | B2 | 10/2004 | Jones et al. | |
| 6,810,305 | B2 | 10/2004 | Kirkpatrick, Jr. | |
| 6,859,976 | B2 | 3/2005 | Plankenhorn | |
| 6,883,201 | B2 | 4/2005 | Jones et al. | |
| 6,904,335 | B2 | 6/2005 | Solomon | |
| 6,925,679 | B2 | 8/2005 | Wallach et al. | |
| 6,938,298 | B2 | 9/2005 | Aasen | |
| 6,941,199 | B1 | 9/2005 | Bottomley et al. | |
| 6,956,348 | B2 | 10/2005 | Landry et al. | |
| 6,966,098 | B2 | 11/2005 | Sako et al. | |
| 6,999,850 | B2 | 2/2006 | McDonald | |
| 7,013,527 | B2 | 3/2006 | Thomas, Sr. et al. | |
| 7,024,278 | B2 | 4/2006 | Chiappetta et al. | |
| 7,053,580 | B2 | 5/2006 | Aldred | |
| 7,054,716 | B2 | 5/2006 | McKee et al. | |
| 7,066,291 | B2 | 6/2006 | Martins et al. | |
| 7,079,923 | B2 | 7/2006 | Abramson et al. | |
| 7,082,350 | B2 | 7/2006 | Skoog | |
| 7,085,624 | B2 | 8/2006 | Aldred et al. | |
| 7,089,099 | B2 | 8/2006 | Shostak et al. | |
| 7,103,460 | B1 | 9/2006 | Breed | |
| 7,113,847 | B2 * | 9/2006 | Chmura et al. | 700/245 |
| 2,531,305 | A1 | 10/2006 | Kim | |
| 7,133,746 | B2 | 11/2006 | Abramson et al. | |
| 7,155,308 | B2 | 12/2006 | Jones | |
| 7,162,056 | B2 | 1/2007 | Burl et al. | |
| 7,162,338 | B2 | 1/2007 | Goncalves et al. | |
| 7,167,775 | B2 | 1/2007 | Abramson et al. | |
| 7,170,252 | B2 | 1/2007 | Maeki | |
| 7,173,391 | B2 | 2/2007 | Jones et al. | |
| 7,177,737 | B2 | 2/2007 | Karlsson et al. | |
| 7,184,586 | B2 | 2/2007 | Jeon et al. | |
| 7,188,000 | B2 | 3/2007 | Chiappetta et al. | |
| 7,197,374 | B2 | 3/2007 | Silverbrook et al. | |
| 7,210,185 | B2 | 5/2007 | Paas | |
| 7,237,298 | B2 | 7/2007 | Reindle et al. | |
| 7,248,951 | B2 | 7/2007 | Hulden | |
| 7,251,853 | B2 | 8/2007 | Park et al. | |
| 7,272,467 | B2 | 9/2007 | Goncalves et al. | |
| 7,275,280 | B2 | 10/2007 | Haegermarck et al. | |
| 7,288,912 | B2 | 10/2007 | Landry et al. | |
| 7,320,149 | B1 | 1/2008 | Huffman et al. | |
| 7,324,870 | B2 * | 1/2008 | Lee | 700/245 |
| 7,332,890 | B2 | 2/2008 | Cohen et al. | |
| 7,343,222 | B2 | 3/2008 | Solomon | |
| 7,346,428 | B2 | 3/2008 | Huffman et al. | |
| 7,388,343 | B2 | 6/2008 | Jones et al. | |
| 7,389,156 | B2 | 6/2008 | Ziegler et al. | |
| 7,389,166 | B2 | 6/2008 | Harwig et al. | |
| 7,412,748 | B2 | 8/2008 | Lee et al. | |
| 7,424,766 | B2 * | 9/2008 | Reindle et al. | 15/319 |
| 7,430,455 | B2 | 9/2008 | Casey et al. | |
| 7,438,766 | B2 | 10/2008 | Song et al. | |

(56) References Cited

U.S. PATENT DOCUMENTS

| | | |
|---|---|---|
| 7,441,298 B2 | 10/2008 | Svendsen et al. |
| 7,444,206 B2 | 10/2008 | Abramson et al. |
| 7,448,113 B2 | 11/2008 | Jones et al. |
| 7,450,367 B2 | 11/2008 | Frank et al. |
| 2001/0027360 A1 | 10/2001 | Nakano et al. |
| 2001/0047231 A1 | 11/2001 | Peless et al. |
| 2001/0047559 A1 | 12/2001 | Graham et al. |
| 2001/0049855 A1 | 12/2001 | Massaro |
| 2002/0002751 A1 | 1/2002 | Fisher |
| 2002/0011813 A1 | 1/2002 | Koselka et al. |
| 2002/0016649 A1 | 2/2002 | Jones |
| 2002/0050016 A1 | 5/2002 | William et al. |
| 2002/0066149 A1 | 6/2002 | Gerber et al. |
| 2002/0100494 A1 | 8/2002 | Brown et al. |
| 2002/0132752 A1 | 9/2002 | Caruthers, Jr. |
| 2002/0156556 A1 | 10/2002 | Ruffner |
| 2002/0174506 A1 | 11/2002 | Wallach et al. |
| 2003/0009270 A1 | 1/2003 | Breed |
| 2003/0014186 A1 | 1/2003 | Adams, Jr. et al. |
| 2003/0025472 A1 | 2/2003 | Jones et al. |
| 2003/0060928 A1 | 3/2003 | Abramson et al. |
| 2003/0080901 A1 | 5/2003 | Piotrowski |
| 2003/0102014 A1 | 6/2003 | Yoshino |
| 2003/0120389 A1 | 6/2003 | Abramson et al. |
| 2003/0126701 A1 | 7/2003 | Aasen |
| 2003/0149676 A1 | 8/2003 | Kasabov |
| 2003/0159223 A1 | 8/2003 | Plankenhorn |
| 2003/0196294 A1* | 10/2003 | Conrad ............ 15/331 |
| 2003/0234730 A1 | 12/2003 | Arms |
| 2004/0002305 A1 | 1/2004 | Bvman-Kivivuori et al. |
| 2004/0031111 A1 | 2/2004 | Porchia et al. |
| 2004/0031113 A1 | 2/2004 | Wosewick et al. |
| 2004/0031121 A1 | 2/2004 | Martin et al. |
| 2004/0034466 A1 | 2/2004 | Hood |
| 2004/0049877 A1 | 3/2004 | Jones et al. |
| 2004/0143930 A1 | 7/2004 | Haegermarck |
| 2004/0162227 A1 | 8/2004 | Caruthers, Jr. |
| 2004/0187249 A1 | 9/2004 | Jones et al. |
| 2004/0193322 A1 | 9/2004 | Pirjanian et al. |
| 2004/0195330 A1 | 10/2004 | Silverbrook et al. |
| 2004/0204792 A1 | 10/2004 | Taylor et al. |
| 2004/0221417 A1* | 11/2004 | Grosze et al. ............ 15/385 |
| 2004/0244138 A1 | 12/2004 | Taylor et al. |
| 2004/0255413 A1* | 12/2004 | Peters et al. ............ 15/83 |
| 2005/0017181 A1 | 1/2005 | Kearfott et al. |
| 2005/0022273 A1 | 1/2005 | Maeki |
| 2005/0065662 A1* | 3/2005 | Reindle et al. ............ 701/1 |
| 2005/0156562 A1 | 7/2005 | Cohen et al. |
| 2005/0162119 A1 | 7/2005 | Landry et al. |
| 2005/0166354 A1 | 8/2005 | Uehigashi |
| 2005/0166355 A1 | 8/2005 | Tani |
| 2005/0171636 A1 | 8/2005 | Tani |
| 2005/0171644 A1 | 8/2005 | Tani |
| 2005/0177974 A1* | 8/2005 | Conrad et al. ............ 15/353 |
| 2005/0188494 A1 | 9/2005 | Takenaka |
| 2005/0217042 A1 | 10/2005 | Reindle |
| 2005/0218852 A1 | 10/2005 | Landry et al. |
| 2005/0229340 A1 | 10/2005 | Sawalski et al. |
| 2006/0074525 A1 | 4/2006 | Close et al. |
| 2006/0085095 A1 | 4/2006 | Reindle et al. |
| 2006/0101604 A1* | 5/2006 | Frederick et al. ............ 15/319 |
| 2006/0103523 A1* | 5/2006 | Field ............ 340/540 |
| 2006/0155398 A1 | 7/2006 | Hoffberg et al. |
| 2006/0184293 A1 | 8/2006 | Konandreas et al. |
| 2006/0190132 A1 | 8/2006 | Morse et al. |
| 2006/0190133 A1 | 8/2006 | Konandreas et al. |
| 2006/0190134 A1 | 8/2006 | Ziegler et al. |
| 2006/0190146 A1 | 8/2006 | Morse et al. |
| 2006/0200281 A1 | 9/2006 | Ziegler et al. |
| 2006/0236492 A1 | 10/2006 | Sudo |
| 2006/0238156 A1 | 10/2006 | Kim |
| 2006/0288519 A1 | 12/2006 | Jaworski et al. |
| 2006/0293794 A1 | 12/2006 | Harwig et al. |
| 2006/0293809 A1 | 12/2006 | Harwig et al. |
| 2007/0016328 A1 | 1/2007 | Ziegler et al. |
| 2007/0028574 A1 | 2/2007 | Yan |
| 2007/0042716 A1 | 2/2007 | Goodall et al. |
| 2007/0061040 A1 | 3/2007 | Augenbraun et al. |
| 2007/0061041 A1 | 3/2007 | Zweig |
| 2007/0069680 A1 | 3/2007 | Landry et al. |
| 2007/0089250 A1* | 4/2007 | Hsiao ............ 15/42 |
| 2007/0100500 A1 | 5/2007 | Abramson et al. |
| 2007/0131822 A1 | 6/2007 | Stallard |
| 2007/0179670 A1 | 8/2007 | Chiappetta et al. |
| 2007/0208442 A1 | 9/2007 | Perrone |
| 2007/0209339 A1* | 9/2007 | Conrad ............ 55/345 |
| 2007/0234492 A1 | 10/2007 | Svendsen et al. |
| 2007/0244610 A1 | 10/2007 | Ozick et al. |
| 2007/0250212 A1 | 10/2007 | Halloran et al. |
| 2007/0260394 A1 | 11/2007 | Dean |
| 2007/0262884 A1 | 11/2007 | Goncalves et al. |
| 2007/0266508 A1 | 11/2007 | Jones et al. |
| 2007/0272463 A1 | 11/2007 | Yu et al. |
| 2007/0285041 A1 | 12/2007 | Jones et al. |
| 2007/0290828 A1 | 12/2007 | Choi et al. |
| 2008/0000041 A1 | 1/2008 | Jones et al. |
| 2008/0000042 A1 | 1/2008 | Jones et al. |
| 2008/0001566 A1 | 1/2008 | Jones et al. |
| 2008/0007193 A1 | 1/2008 | Jones et al. |
| 2008/0039974 A1 | 2/2008 | Sandin et al. |
| 2008/0047092 A1 | 2/2008 | Schnittman et al. |
| 2008/0056933 A1 | 3/2008 | Moore et al. |
| 2008/0058987 A1 | 3/2008 | Ozick et al. |
| 2008/0084174 A1 | 4/2008 | Jones et al. |
| 2008/0086236 A1 | 4/2008 | Saito et al. |
| 2008/0091303 A1 | 4/2008 | Jung et al. |
| 2008/0091304 A1 | 4/2008 | Ozick et al. |
| 2008/0091305 A1 | 4/2008 | Svendsen et al. |
| 2008/0097645 A1 | 4/2008 | Abramson et al. |
| 2008/0109126 A1 | 5/2008 | Sandin et al. |
| 2008/0127445 A1 | 6/2008 | Konandreas et al. |
| 2008/0127446 A1 | 6/2008 | Ziegler et al. |
| 2008/0134457 A1 | 6/2008 | Morse et al. |
| 2008/0134458 A1 | 6/2008 | Ziegler et al. |
| 2008/0140255 A1 | 6/2008 | Ziegler et al. |
| 2008/0141485 A1 | 6/2008 | Kim et al. |
| 2008/0150466 A1 | 6/2008 | Landry et al. |
| 2008/0155768 A1 | 7/2008 | Ziegler et al. |
| 2008/0172824 A1 | 7/2008 | Yun et al. |
| 2008/0174268 A1 | 7/2008 | Koo et al. |
| 2008/0183349 A1 | 7/2008 | Abramson et al. |
| 2008/0184518 A1 | 8/2008 | Taylor et al. |
| 2008/0188984 A1 | 8/2008 | Harwig et al. |
| 2008/0191653 A1 | 8/2008 | Han et al. |
| 2008/0201895 A1 | 8/2008 | Kim et al. |
| 2008/0206092 A1* | 8/2008 | Crapser et al. ............ 422/5 |
| 2008/0229528 A1 | 9/2008 | Chen et al. |
| 2008/0235897 A1 | 10/2008 | Kim et al. |
| 2008/0249661 A1 | 10/2008 | Hong et al. |
| 2008/0271273 A1 | 11/2008 | Reindle |
| 2008/0271278 A1 | 11/2008 | Jung |
| 2008/0276407 A1 | 11/2008 | Schnittman et al. |
| 2008/0276408 A1 | 11/2008 | Gilbert, Jr. et al. |
| 2008/0281470 A1 | 11/2008 | Gilbert, Jr. et al. |
| 2008/0281481 A1 | 11/2008 | Abramson et al. |
| 2010/0186187 A1* | 7/2010 | Cheung et al. ............ 15/339 |

FOREIGN PATENT DOCUMENTS

| | | |
|---|---|---|
| DE | 10000407 A1 | 7/2001 |
| DE | 20116069 | 12/2001 |
| DE | 10346216 | 9/2004 |
| EP | 1027855 A2 | 8/2000 |
| EP | 1172719 A1 | 1/2002 |
| EP | 1224899 A2 | 7/2002 |
| EP | 1921572 | 5/2008 |
| FR | 850321 | 12/1939 |
| FR | 2446104 A1 | 8/1980 |
| GB | 2352486 | 1/2001 |
| GB | 2404139 | 1/2005 |
| GB | 2409966 | 7/2005 |
| JP | 05095883 | 4/1993 |
| JP | 05250032 | 9/1993 |
| JP | 09145392 | 6/1997 |

(56) References Cited

FOREIGN PATENT DOCUMENTS

| JP | 3395874 | 2/1998 |
|---|---|---|
| JP | 2001315674 | 11/2001 |
| JP | 2005141636 | 2/2005 |
| KR | 2006032333 | 4/2006 |
| KR | 619750 | 9/2006 |
| WO | WO 97/41451 | 11/1997 |
| WO | WO 00/04430 A1 | 1/2000 |
| WO | WO 0038029 | 6/2000 |
| WO | WO 01/37060 | 5/2001 |
| WO | WO 01/82766 A2 | 11/2001 |
| WO | WO 02/00819 | 1/2002 |
| WO | WO 02/39864 A1 | 5/2002 |
| WO | WO 02/101477 A2 | 12/2002 |
| WO | WO 2004/063883 | 7/2004 |
| WO | WO 2005/077244 | 8/2005 |
| WO | WO 2006/089307 | 8/2006 |
| WO | WO 2007/024460 | 3/2007 |
| WO | WO 2007/065030 | 6/2007 |
| WO | WO 2007/065031 | 6/2007 |
| WO | WO 2007/065033 | 6/2007 |
| WO | WO 2007/100756 | 9/2007 |
| WO | WO 2007/109624 | 9/2007 |
| WO | WO 2007/109627 | 9/2007 |
| WO | WO 2008/060690 | 5/2008 |

OTHER PUBLICATIONS

Jurgen Bohn and Friedemann Mattern: "Super-distributed RFID Tag Infrastructures" Second European Symposium, EUSAI 2004 (Online) Nov. 1, 2004 Eindhoven, The Netherlands Retrieved from the Internet: URL :http//www.springerlink.com/content/lrqp441x6mcf3ktm/fulltext.pdf.
International Search Report Opinion of PCT/US2006/025037.

* cited by examiner

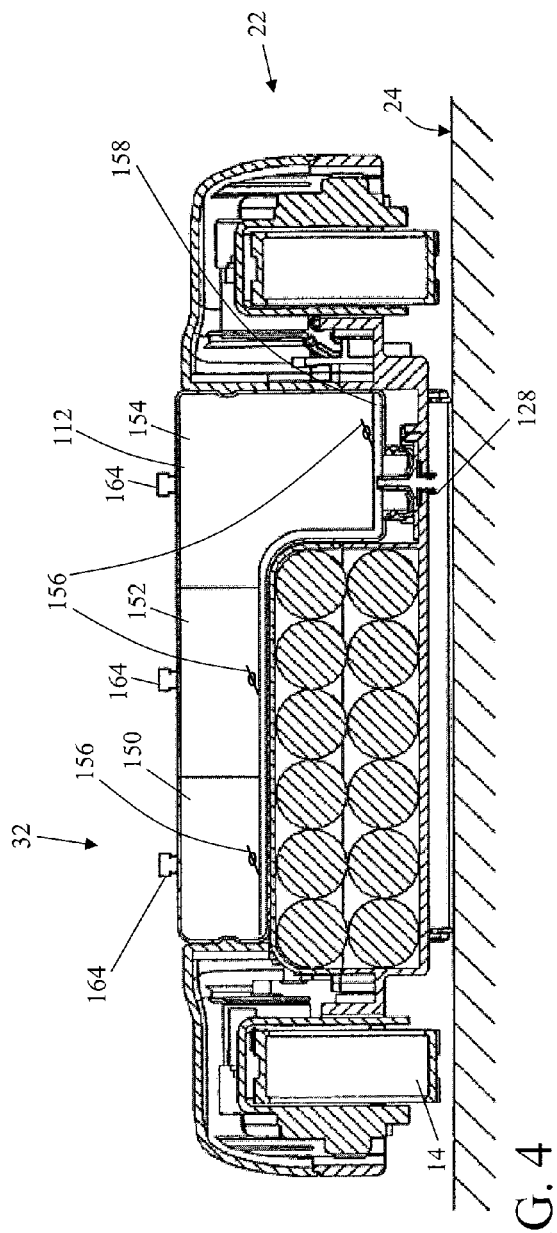
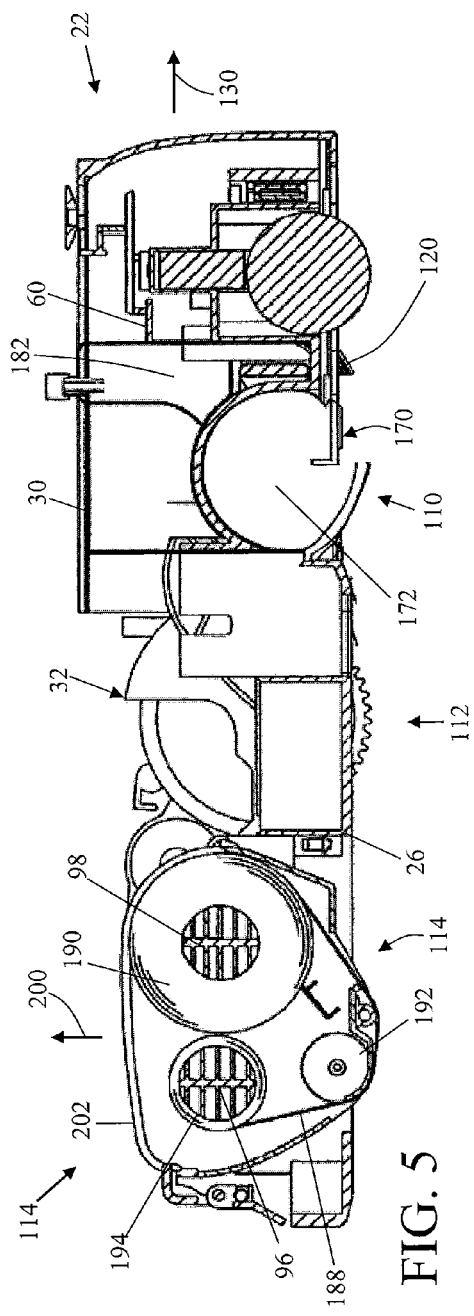

TRAINABLE MULTI-MODE FLOOR CLEANING DEVICE

CROSS REFERENCE TO RELATED APPLICATIONS

This application claims priority to U.S. Provisional Patent Application Ser. No. 61/186,222 filed on Jun. 11, 2009 titled "Trainable Multi-Mode Floor Cleaning Device" the disclosure of which is incorporated herein.

BACKGROUND OF THE INVENTION

1. Field of the Invention

The present invention relates to autonomous cleaning systems, and more particularly, to autonomous floor cleaning devices that are operable in a number of cleaning "modes" and are trainable such that users can specify a desired cleaning path for the floor cleaning device.

2. Discussion of the Related Art

Autonomous floor cleaning devices have gained in popularity and utility in recent years. The various benefits of having a cleaning device that will automatically initiate and complete a cleaning routine without continuous user interaction have increased the common use of such devices. However, such devices are not without their respective drawbacks.

One drawback of such a device can be attributed to the navigation of such devices. Because many floor cleaning devices are designed to randomly traverse the area to be cleaned, many such systems are provided with generally complex navigation systems that include collision avoidance features, device position monitoring systems, and ledge avoidance guidance.

The collision avoidance systems are often configured such that the device does not unnecessarily contact the relatively rigid structures associated with furniture, walls, and the like. Such operation protects the appearance of both the structure and the device as well as the operating integrity of the device. Many such navigation controls also include systems that are configured to detect moving objects, such as persons or pets, in the vicinity of the device. Commonly, the navigation systems interrupt device operation or alter the travel direction of the device so that the device avoids contact and/or does not unnecessarily interfere with the travel of moving bodies.

The device position monitoring systems also complicate device construction and implementation. The known art discloses a number of paradigms associated with monitoring the position of the device relative to its operating environment. Such systems commonly include positioning a number of detectors about the operating environment and configuring the device to wirelessly communicate with the detectors. Complex triangulation calculations are then used to assess the position of the device with respect to the operating environment such that the device can alter travel directions to ensure near full coverage of the area to be cleaned. Alternatively, other more demanding positioning systems, such as global positioning systems (GPS) have been provided to near continuously assess the position the autonomous device relative to a work environment.

As mentioned above, many autonomous floor cleaning devices also include structures or controls associated with ledge avoidance guidance. Many autonomous floor cleaning devices are simply unable to traverse stairs or elevational discontinuities common to many living environments. To avoid traveling over such structures, many floor cleaning devices are provided with electronic or mechanical "feeler" systems that detect elevational discrepancies in the path of the device. When such a discrepancy is detected, the navigation system alters the direction of travel of the device such that the device maintains an upright orientation.

Each of the navigation and guidance solutions discussed above complicates the construction of the respective autonomous floor device and/or use or integration of the floor cleaning device relative to the intended operating environment. Furthermore, where such systems require the movable device to support the operation of the necessary detectors, sensors, and the like, such systems increase the weight associated with the moving portion of the cleaning system as well as consume the limited energy resources that must be supported by the autonomous device. Furthermore, more sophisticated navigational controls increase manufacturing and operational demands associated with providing such systems. Accordingly, although such systems improve user confidence that the device will be able to maintain its autonomous nature for a longer duration and/or for a number of cleaning cycles without user interaction, such systems also substantially complicate the construction of the device and reduce the amount of energy that is available for consumption by the cleaning systems.

Therefore, it would be desirable to provide an autonomous floor cleaning device with a guidance/control system having more efficient operation and that is simple to implement.

Independent of the navigation/guidance system of the autonomous floor cleaning device, many such devices are known and operate in a variety of cleaning modes. For example, autonomous floor cleaning devices that include vacuum cleaners, floor buffers, wet floor cleaning systems, and autonomous floor cleaning devices that apply a wet and/or a dry fabric, cloth, or woven applicator to a floor are known. Although such systems improve the utility of autonomous floor cleaning devices, such devices are not without their respective drawbacks.

For instance, during autonomous operation, cleaning devices equipped with a rotatable brush or "beater bar" can occasionally snag or become entangled with an end of a thread or fray commonly found near the perimeter of the carpet of a room. Such occurrence presents the opportunity that the cleaner will unravel the thread into the field of the carpet causing an unacceptable blemish. Further, for those systems equipped with multiple cleaning modes, such as a rotating brush for use with carpet and a cleaning pad for use with floors, it is commonly undesirable to have both of such cleaning systems concurrently engaged. As is commonly understood, operating a rotatable brush over wood covered floors can mar or undesirably affect the finish of the floor if debris becomes entangled in the rotatable brush. Similarly, passing a cleaning cloth over a carpeted floor can result in unnecessary use and/or wear of the cleaning cloth and/or floor carpet as well as premature draining of the power source of the autonomous cleaning device.

Furthermore, although a number of known devices have multiple cleaning modes, such devices are generally not specific to the particular composition of the material of the floor being cleaned. That is, such devices are commonly limited with respect to cleaning carpeted floors as compared to solid surface floors. Understandably, with respect to solid surface flooring materials, it is often desirable to have a cleaning mode that is more nearly tailored to the type of material being cleaned. Simply, such devices commonly leave many areas that are simply not adequately cleanable with a given device configuration. Such operation requires a user to either provide multiple differently configured cleaning devices and/or be present to alter the state of operation of the cleaning device to coincide with the floor beneath the device. Providing multiple floor cleaning devices unnecessarily increases user costs whereas manually configuring such devices for operation over different flooring materials detracts from the benefits associated with the autonomous nature of such systems.

Therefore, it would also be desirable to provide an autonomous floor cleaning device that is operable in several cleaning modes without unnecessary operation of those systems associated with unused cleaning devices and/or undesirable user interaction/monitoring of the device.

As evidenced below, the assignee of the present application has contributed significantly to manual and automatic cleaning technologies.

U.S. Patent Application Publication 2004/0031121, filed on Aug. 14, 2002, discloses an autonomous floor cleaning device that includes a vacuum cleaner having a beater bar and which is generally encircled by a replaceable disposable dust ruffle. U.S. Patent Application Publication 2004/0031113, also filed on Aug. 14, 2002, discloses a similar device with a non-concentric trailing portion that is equipped with an electrostatic skirt. U.S. Patent Application Publication 2004/0031111, filed on Feb. 19, 2004, discloses a replaceable receptacle that cooperates with an autonomous floor cleaning device for collecting and disposing of debris collected by the device.

Allowed U.S. Patent Application Publication 2005/0229340, filed on Feb. 4, 2005, disclose an autonomous floor cleaning device that includes a reel of cleaning material that is supported behind a rotatable brush with respect to a direction of travel of the cleaning device. The device includes a fluid dispenser that applies a cleaning solution to the cleaning material to improve the efficacy of the cleaning material.

U.S. Patent Application Publication 2006/0288519, filed on Jun. 28, 2005, and issued as U.S. Pat. No. 7,578,020, discloses an autonomous floor cleaning device that includes a number of cleaning devices that removably cooperate with the device such that each cleaning device is independently removable and replaceable.

U.S. Patent Application Publication 2006/0293794, filed on Jun. 28, 2005, discloses an autonomous cleaning device that cooperates with RFID tags associated with the area that is to be cleaned so as to determine the cleaning path and operation of the device.

U.S. Patent Application Publication 2008/0188984, filed on Apr. 10, 2008, and issued as U.S. Pat. No. 7,389,166, discloses autonomous floor cleaning devices that are configured to apply a liquid to the floor being cleaned and constructed to limit wheel slip during movement of the device across the floor.

Although only tangentially related to the subject matter of the above-referenced publications, a PCT application, which claims priority to U.S. Provisional Patent Application Ser. No. 60/948,676, was filed on Jul. 9, 2007 and titled "Handheld Portable Devices For Touchless Particular Matter Removal" and discloses a handheld cleaning device that is useful for removing particulate debris in a manner wherein the cleaning device does not contact the underlying surface being cleaned.

Also generally unrelated to autonomous floor cleaning device, Applicant's copending PCT International Application PCT/US2008/003926, filed on Mar. 26, 2008, entitled "Refillable Devices For Dispensing Fluids", which claims priority to U.S. Provisional Application Ser. No. 60/908,312, filed on Mar. 27, 2007, and U.S. Provisional Application Ser. No. 60/946,848, filed on Jun. 28, 2007, discloses a cleaning system that includes a number of cleaning solutions in a unitary package for application to at least one surface to be cleaned. As will be apparent to one of ordinary skill, such a system could be mounted to the device of the present invention to give it cleaning capabilities for multiple surfaces.

The disclosures of each of the documents referenced above, as they each generally relate to cleaning operations, are hereby expressly incorporated by reference.

Therefore, in accordance with the background discussed above, it would be desirable to provide an autonomous cleaning device that can be economically produced, is simple to use and can be easily integrated and/or configured for operation in a variety of environments, and supports a number of cleaning modes wherein each mode can be associated with a type of floor material that is intended to be cleaned.

BRIEF SUMMARY OF THE INVENTION

The present invention is directed to autonomous devices such as toys, floor and/or lawn cleaning devices, and or any other device whose operation is autonomous in nature. One embodiment of the present invention envisions the autonomous device as an automatic floor cleaning device that overcomes one or more of the aforementioned drawbacks. One aspect of the present invention includes a floor cleaning device that autonomously traverses an area to be cleaned. The floor cleaning device includes a drive mechanism that is attached to a housing for propelling the floor cleaning device across a floor. A controller is in communication with the drive mechanism for controlling movement of the floor cleaning device across the floor. The controller includes a training mode wherein manual user manipulation of the floor cleaning device defines a cleaning route and a cleaning mode wherein the controller automatically initiates the cleaning route.

Another aspect of the invention combinable with one or more of the aspects above includes a method of controlling operation of a floor cleaning device that is configured for autonomous operation. The method includes the steps of training the floor cleaning device with a cleaning route by manually manipulating the floor cleaning device through the cleaning route. After the cleaning route has been defined by manual manipulation of the cleaning device, the cleaning device automatically initiates the cleaning route at selected intervals as defined by a user. Preferably, defining the cleaning route includes associating one of a number of cleaning modalities with the respective route. Preferably, each modality is associated with a flooring material associated with the respective cleaning route.

A further aspect of the invention useable with one or more of the above aspects includes an autonomous cleaning device that has first and second cleaning systems that are each supported by a frame. Each of the first and second cleaning systems provide first and second cleaning modes, respectively, wherein the second cleaning mode is different than the first cleaning mode. The cleaning device includes a controller that is configured to control operation of the autonomous cleaning device and initiate operation of the first cleaning system for a first cleaning path and initiate operation of the second cleaning system for a second cleaning path. Accordingly, the autonomous cleaning device can perform cleaning operation across various flooring materials in a generally continuous and uninterrupted manner.

These, and other aspects and objects of the present invention, will be better appreciated and understood when considered in conjunction with the following description and the accompanying drawings. It should be understood, however, that the following description, while indicating preferred embodiments of the present invention, is given by way of illustration and not of limitation. Many changes and modifications may be made within the scope of the present invention without departing from the spirit thereof, and the invention includes all such modifications.

BRIEF DESCRIPTION OF THE DRAWINGS

The advantages and features constituting the present invention, and the construction and operation of typical mechanisms provided with the present invention, will become more readily apparent by referring to the exemplary, and therefore non-limiting, embodiments illustrated in the drawings accompanying and forming a part of this specification, wherein like reference numerals designate the same elements in the several views, and in which:

FIG. 4 is an elevation cross-section view of the autonomous floor cleaning device taken along line 4-4 shown in FIG. 3;

FIG. 5 is an elevation cross-section view of the autonomous floor cleaning device taken along line 5-5 shown in FIG. 3;

Figure 1:
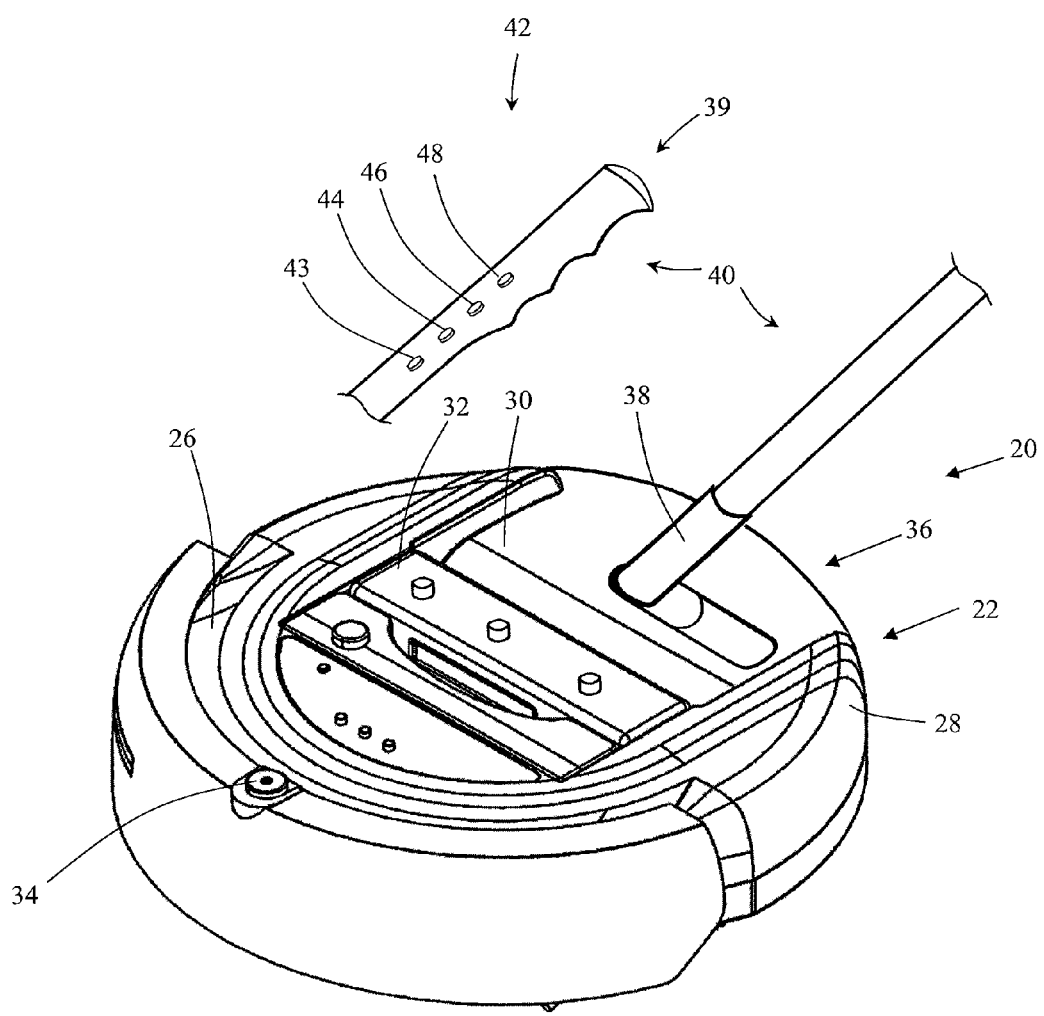
FIG. 1 is a perspective view of an autonomous floor cleaning device according to the present invention with a training handle extending from the device.

In describing the preferred embodiment of the invention which is illustrated in the drawings, specific terminology will be resorted to for the sake of clarity. However, it is not intended that the invention be limited to the specific terms so selected and it is to be understood that each specific term includes all technical equivalents which operate in a similar manner to accomplish a similar purpose. For example, the words "connected", "attached", or terms similar thereto are often used. It is intended that such terms are not limited to direct connection but include connection through other elements where such connection is recognized as being equivalent by those skilled in the art.

DETAILED DESCRIPTION

FIG. 1 shows an autonomous floor cleaning system 20 according to the present invention. As discussed below, floor cleaning system 20 is constructed to perform autonomous or independent floor cleaning operations. As mentioned above, other cleaning systems/devices and/or floor cleaning systems/devices are disclosed in U.S. Pat. Nos. 7,389,166 and 7,578,020; United States Patent Application Publication Nos. 2004/0031121, 2004/0031113, 2004/0031111, 2005/0229340, 2006/0288519, 2006/0293794, 2008/0188984; and U.S. Provisional Patent Application Ser. Nos. 60/948,676, 60/908,312, and 60/946,848; the disclosures of each of which are hereby expressly incorporated. It is appreciated that the autonomous device disclosed herein has applications beyond floor cleaning such as lawn care and toys and/or entertainment purposes. In an exemplary embodiment, autonomous device 22 is configured to perform floor cleaning operations. In a more preferred embodiment of the invention, device 22 is configured to provide a number of different modality floor treatments.

Figure 7:
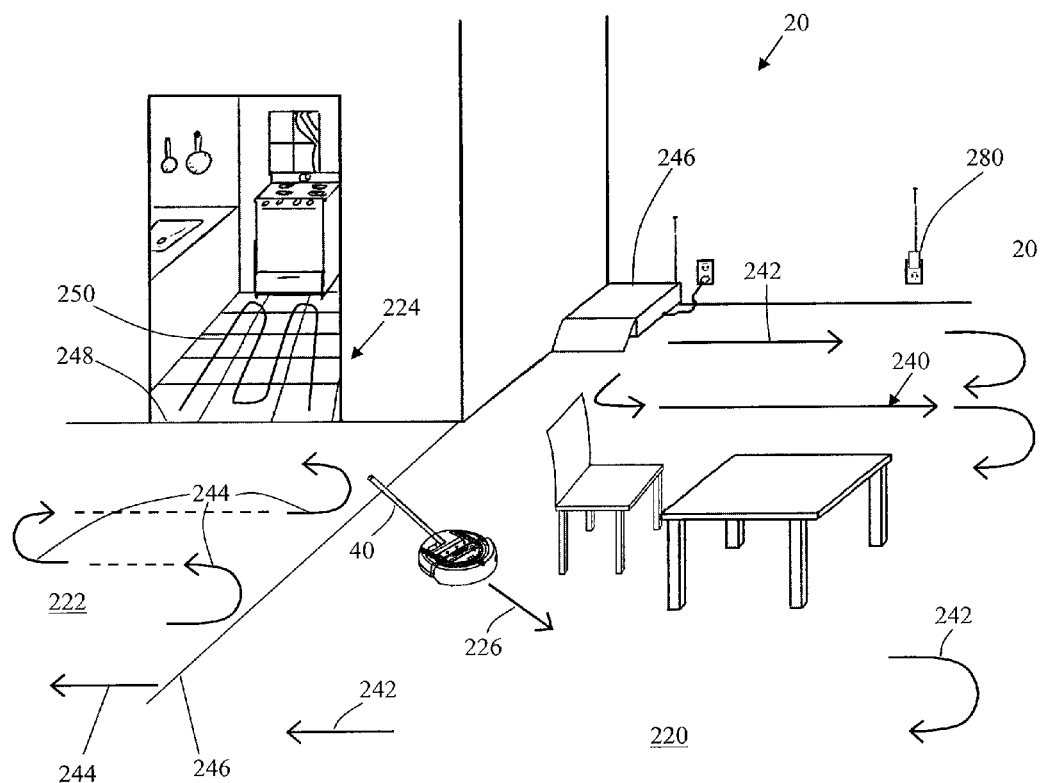
FIG. 7 is a perspective view of the floor cleaning device shown in FIG. 1 in an exemplary operating environment during a training routine.

Referring to FIG. 1, floor cleaning system 20 includes a trainable autonomous floor cleaning device, autonomous cleaning device, or floor cleaning device 22 that can automatically traverse an operating environment or area to be cleaned 24. Floor cleaning device 22 includes a frame 26 that supports a housing 28 and a number of cartridges 30, 32 associated with different cleaning modes. Cleaning device 22 includes a communication device 34, such as a transmitter/receiver. As described below with respect to FIGS. 7-8, communication device 34 is configured to communicate with devices that are remotely positioned relative to floor cleaning device 22—such as a base station 246 (FIG. 7) and/or other position indicating devices such as a beacon 280 (FIG. 7). As used herein, the term beacon is defined as any including any of a number of communication protocols including infrared (IR) ultrasonic, radio frequency (RF), a wireless fidelity (Wi-Fi network), or other partially or wholly wired or wireless communication protocols. It is further envisioned that one or both of device 22, base station 246, and beacon 280 be configured send information, receive information, and/or send and receive information. It is further envisioned that, although only one beacon 280 is shown, cleaning system 20 may include more than one beacon and that the beacons be located with respect to area 24 as one or more to a given area or room of a particular cleaning environment. Wherein cleaning device 22 reports to a base station, it is further envisioned that base station 246 includes containers and/or is connected to a fluid supply for automatically refilling any of the consumable fluid materials associated with the operation of device 22. As described further below, it is also envisioned that cleaning device 22 include one or more replaceable, refillable, and/or interchangeable cleaning solutions or implements.

Housing 20 preferably includes a pocket 36 that is constructed to receive a stem 38. Stem 38 is pivotably or rotatably connected to floor cleaning device 22. A handle 40 removably and/or telescopically cooperates with stem 38 so as to extend upward and rearward relative to floor cleaning device 22 when handle 40 is connected to floor cleaning device 22. Understandably, stem 38 could be integrally formed with handle 40 such that the combined handle and stem 38, 40 could be fully removed from floor cleaning device 22. Alternatively, handle 40 could be provided with a telescopic construction so as to cooperate with a corresponding pocket 36 formed in housing 28. Such a construction would allow handle 40 to be collapsible between stored and in-use positions.

Still referring to FIG. 1, a distal end 39 of handle 40 includes a grip portion 42 that is preferably shaped to cooperate with a user's hand. Preferably, a number of inputs 43, 44, 46, 48 are positioned near grip portion 42 and communicate user instructions to floor cleaning device 22. As described further below with respect to FIGS. 7 and 8, inputs 43, 44, 46, 48 provide the instructions to floor cleaning device 22 to enable autonomous operation of the floor cleaning device 22.

It is further envisioned that device 22 be constructed to allow a user to schedule the time, duration, and/or sequence of operation of the respective cleaning procedures. Said in another way, device 22 can be manually configured to autonomously execute a cleaning routine in a manner wherein the user can designate the time of day that the device executes the routine or portions thereof. For instance, in a residential application, device 22 can be configured to execute cleaning operations of bedrooms during the day when most people are not in such rooms and execute cleaning operations of common areas such as kitchens and living rooms at night when most users are asleep. Although the operation of device 22 can be conveniently scheduled for operation in areas when no people are present, device 22 is spatially and acoustically unobtrusive so as to allow operation of device 22 in the same room or rooms near users without interfering with the activities of users.

It is further envisioned that device 22 can be configured to provide a more rigorous cleaning operation in those areas than are more heavily used or trafficked and a less rigorous cleaning operation in those areas that commonly require lesser levels of cleaning such as bedrooms or guest spaces. Said in another way, operation of device 22 can be focused to desired areas. It is envisioned that such cleaning operations can be segregated by one or more of the duration device 22 spends in a given area and/or the frequency with which device 22 cleans a given area. Preferably, one or more of handle 40 or device 22 includes an interface that allows a user to configure device 22 for the desired cleaning schedule interval and/or frequency in a manner that satisfies individual user preferences. Such a configuration allows device 22 to be configured to execute a multiple area cleaning procedure that generally mimics a user's manual or unassisted cleaning routine.

Figure 2:
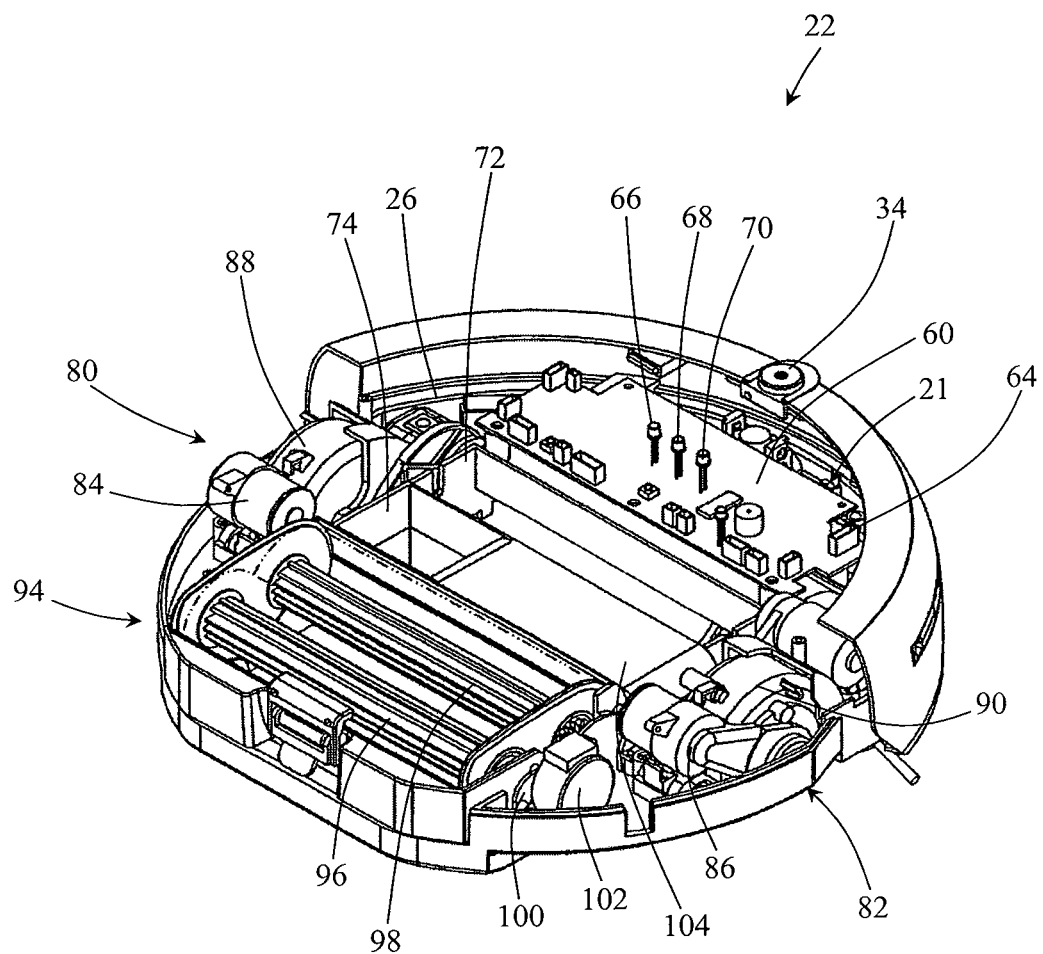
FIG. 2 is a top perspective view of the autonomous floor cleaning device shown in FIG. 1 with a cover removed therefrom.

As shown in FIG. 2, floor cleaning device 22 includes a navigation system 21 that communicates with, or is integral to, a controller 60. Controller 60 is powered by a power source 62 and in communication with a database or information storage device 64. Controller 60 is also operationally connected to communication device 34. A number of indicators 66, 68, 70 extend from controller 60 and are configured to provide an indication of the operating condition of floor cleaning device 22 and/or, as described further below, the condition of one or more of a number of distinct cleaning systems. Understandably, although indicators 66, 68, 70 are shown as LED's, it is envisioned that indicators 66, 68, 70 be provided in other modalities such as an audible or tactile alert.

A first cavity 72 and a second cavity 74 are formed in frame 26 and operationally cooperate with one of cartridges 30, 32 (as shown in FIG. 1). Each of cartridges 30, 32 are associated with a cleaning system or different cleaning modalities. A first drive system 80 and a second drive system 82 are positioned on generally laterally opposite sides of cavities 72, 74. Each drive system 80, 82 includes a motor 84, 86 that is operationally connected to a drive wheel 88, 90. Drive systems 80, 82 are connected to controller 60 such that each drive wheel 88, 90 is independently operable with respect to one another. As is commonly understood, the independent operation of each of the drive wheels 88, 90 allows cleaning device 22 to move in virtually any direction relative to operating environment 24. It is further understood that such a configuration allows cleaning device 22 to move about a cleaning environment with what is commonly referred to, particularly in lawn care applications, a zero turn radius.

It is further envisioned that rather than having a motor and wheel based drive system, cleaning device 22 could be configured for operation by hover-type movement. For example, cleaning device 22 could be equipped with a skirt or the like constructed to capture a flow stream, such as that generated by a fan or even the discharge of the vacuum-type cleaning device. Those skilled in the art will appreciate that as the captured gas escapes about the skirt, a cleaning device so equipped would "hover" or otherwise "float" in close proximity to the floor surface. Those skilled in the art will further appreciate that directional movement of such a drive system can be effectuated by directing the discharge in a particular direction so as to yield translation of the cleaning device in a fairly opposite direction.

Furthermore, wheels 88, 90 are sized and coupled to a respective motor 84, 86 so that device 22 can be manually manipulated about environment 24 in an effective manner without undue interference caused by the non-powered rotation of the rotor relative to the stator of motors 84, 86. Said in another way, wheels 88, 90 are configured to provide a sufficient mechanical advantage to overcome the resistance associated with the gears and motors and the respective drive systems 80, 82. Understandably, wheels 88, 90 and drive systems 80, 82 are also configured to provide efficient operation of the drive systems 80, 82 and movement of device 22 during autonomous movement of the same. Preferably, wheels 88, 90 are also constructed to reduce the incidence of wheel slip during autonomous operation of device 22 including during turning operations. That is, wheels 88, 90 are constructed to provide an efficient interaction with the floor surface over which device 22 operates. Those skilled in the art will appreciate that the tolerable or acceptable coefficient of friction of wheels 88, 90 will be determined in part on the desired operating speed of device 22, the coefficient of friction of the floor, the size of the device, desired turning performance, and desired navigation instructions.

Still referring to FIG. 2, floor cleaning device 22 is also preferably constructed to support a consumable cleaning cloth as evidenced by a cloth cartridge 94. Cartridge 94 includes a first shaft 96 and a second shaft 98 that are generally parallel to one another. A roll of cleaning cloth, preferably a non-woven fabric material, is placed upon one of shafts 96, 98, and soiled cloth is collected about the other of shafts 96, 98. Such a construction allows fresh cloth to be directed toward the floor of cleaning area in a generally continuous manner as well as maximizing the consumable life of given areas of the cleaning cloth.

Cartridge 94 includes or cooperates with a drive system 100 that is driven by a motor 102. Motor 102 is operationally connected to controller 60 such that the cloth associated with cartridge area 94 is only introduced to cleaning area 24 in accordance with instructions from controller 60. Each of controller 60, and drive systems 80, 82, 100 is powered by a power source 104 that is supported by floor cleaning device 22. Preferably, power supply 104 is one of rechargeable, interchangeable, and/or replaceable.

Figure 3:
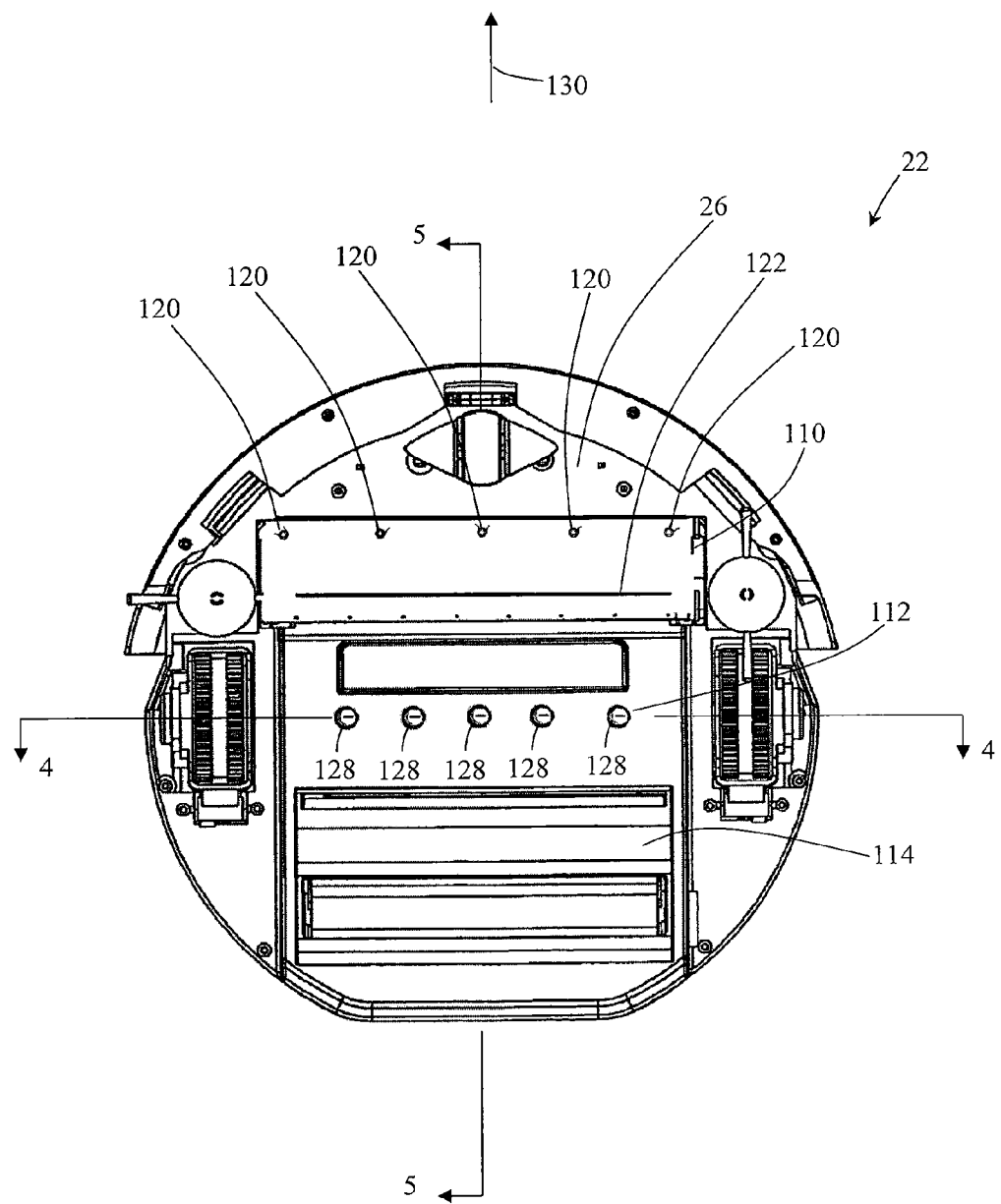
FIG. 3 is a bottom plan view of the autonomous floor cleaning device shown in FIG. 1.

As shown in FIG. 3, a first cleaning apparatus or cleaning system 110, is supported by chassis or frame 26 of floor cleaning device 22. A second cleaning apparatus or cleaning system 112 is positioned generally rearward relative to first cleaning apparatus 110 relative to a forward direction of travel, indicated by arrow 130, of cleaning device 22. Cartridge 94 represents a third cleaning apparatus or cleaning system 114 and is positioned even further rearward of first and second cleaning systems 110, 112. Each of first, second, and third cleaning systems 110, 112, 114 are generally centrally positioned relative to lateral directions relative to direction of travel 130 of floor cleaning device 22. As described further with respect to FIGS. 4-6, each of cleaning systems 110, 112, 114 provides a different cleaning mode such that cleaning device 22 can selectively perform any of a number of different cleaning functions. It is further envisioned that cleaning device 22 effectuate concurrent operation of one or more of cleaning systems 110, 112, and 114 as defined by a user's preferences.

It is further envisioned that different cleaning "modes" may be defined by operation of only portions of a respective cleaning system. For instance, when the cleaning device is equipped with a vacuum based cleaning system, it is envisioned that such a system be operable in a first mode associated with operation of air movement components, a second mode associated with operation of a beater bar or brush type component, and a third mode associated with operation of both of the air movement and brush components. It should be appreciated that the first mode is more applicable to cleaning of a solid floor surface whereas the third mode is more applicable to cleaning of carpeted floor surfaces or surfaces covered with a more deformable floor covering.

Still referring to FIGS. 2 and 3, first cleaning system 110 includes a number of nozzles 120 that direct a pressurized gas or atomized fluid flow over a floor surface so as to evacuate dirt and/or debris found thereon. Dust, dirt, and debris agitated by the discharge of nozzles 120 is directed to an intake port 122 that is positioned proximate thereto. Cleaning system 110 preferably provides touch-less cleaning in a manner like that disclosed in U.S. Patent Application Publication No. 2009/0044372, filed on Jul. 9, 2008, which claims priority to U.S. Provisional Patent Application Ser. No. 60/948,676, filed Jul. 9, 2007, and the disclosures of which are expressly incorporated herein.

Second cleaning system 112 also includes a number of nozzles or discharge ports 128 that selectively apply one or more of a number of cleaning solutions to the floor passing under floor cleaning device 22. As described further with respect to FIGS. 4-6, such a construction allows cleaning device 22 to apply cleaning solutions as a function of one or more of the composition of the floor material as well as the use of the area being cleaned. That is, cleaning system 112 applies those compositions associated with specific floor materials and/or the use of the area being cleaned via operation of cleaning system 112, i.e. bathroom, kitchen, common area, etc.

As introduced above in FIG. 2, third cleaning system 114 is constructed to support a non-woven cloth and/or fabric cleaner that can be configured to electro-statically collect floor debris or dust and/or distribute a cleaning material, such as that dispensed from discharge ports 128, across the floor being cleaned. It is further envisioned that any of cartridges 30, 32, 94 be provided in a removable/replaceable modality, a refillable/reloadable modality, and/or be interchangeable with other cleaning cartridges. For example, where carpeted areas are to be cleaned, the floor cleaning device 22 may be configured to cooperate with another cartridge having, for example, a rotatable brush or beater bar such as that disclosed in U.S. Publication No. 2005/0229340. It is appreciated that such a device includes two operating modes defined as including operation of a vacuum function independent of operation of the rotatable brush and concurrent operation of a vacuum function with the rotatable brush. It is further envisioned that frame 26 of cleaning device 22 can be configured to cooperate with any of cartridges 30, 32, 94 at any of the respective cavities 72, 74.

Figure 6:
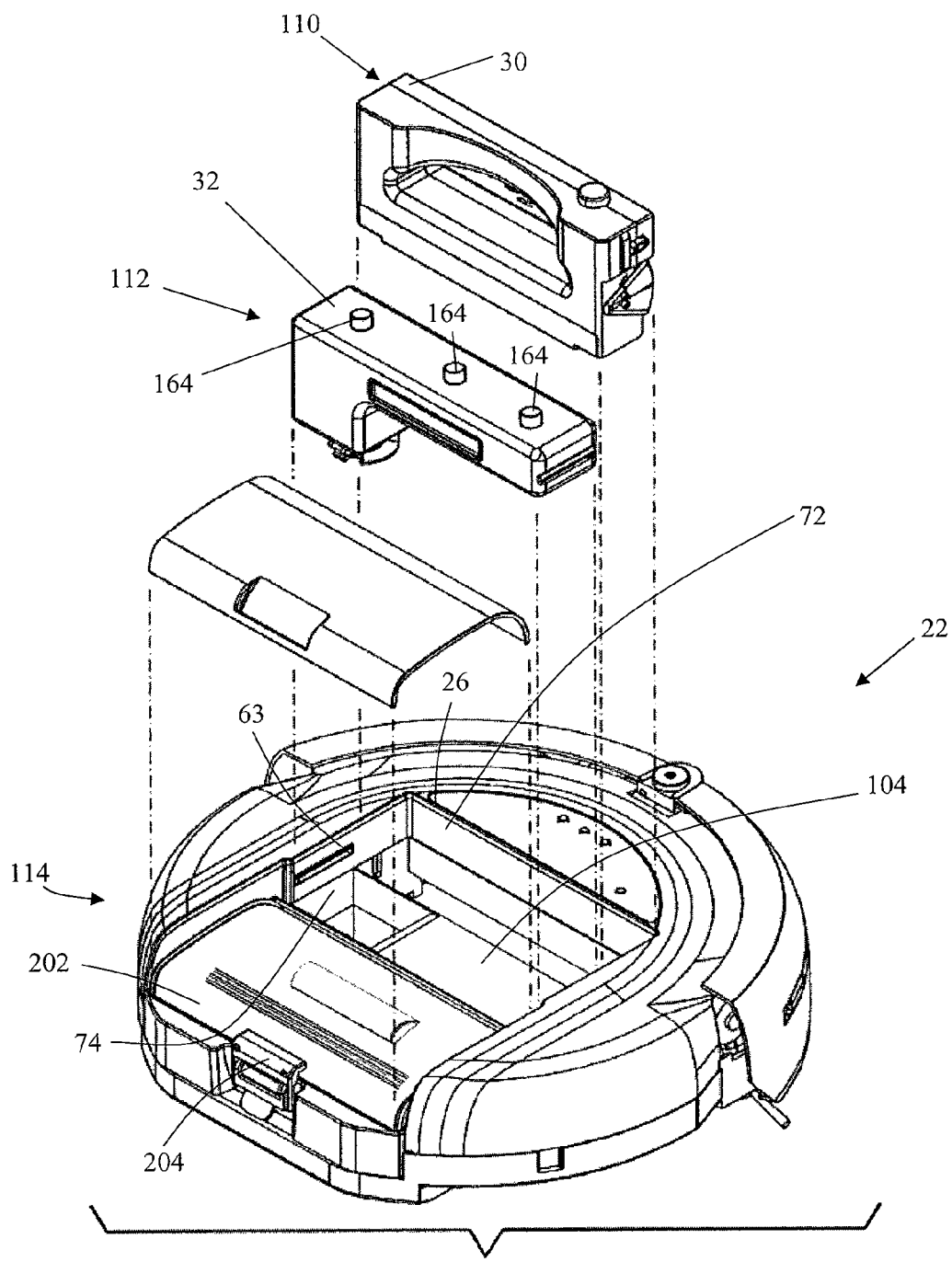
FIG. 6 is a view similar to FIG. 2 with removable or interchangeable cleaning devices exploded from the autonomous cleaning device.

Referring to FIGS. 4-6, cartridge 32 associated with second cleaning system 112 includes a number of fluidly separated chambers 150, 152, 154. Each chamber 150, 152, 154 can be selectively fluidly connected to discharge ports 128 so that one or more of the fluids associated with chambers 150, 152, 154 can be contemporaneously applied. Each chamber 150, 152, 154 includes a valve 156 whose operation is controlled by controller 60 (FIG. 2). A passage 158 fluidly connects one or more of chambers 150, 152, 154 with discharge ports 128 when the valve 156 associated with the respective chamber 150, 152, 154 is opened.

Each chamber 150, 152, 154 includes a removable cap 164 such that each chamber 150, 152, 154 can be independently refilled with a desired solution. As described further below with a FIG. 7, the selective operation of valves 156 of each chamber 150, 152, and 154 allows for cleaning device 22 to apply one or more different solutions to a particular floor area. Controller 60, through its interaction with each valve 156, is configured to indicate depletion of the fluid associated with one or more of chambers 150, 152, 154 via actuation of one of more of indicators 66, 68, 70. It is appreciated that one or more of cartridge 32, or chambers 150, 152, 154 could be provided in a replaceable configuration rather than the refillable configuration as shown.

As shown in FIG. 5, first cleaning device 110, or cartridge 30, includes an intake passage 170 positioned proximate nozzles 120. Dirt or debris agitated from the surface of operating area 24 (FIG. 1) is collected in refuse chamber 172 of cartridge 30. Preferably, cartridge 30 is removable from floor cleaning device 22 such that refuse chamber 172 can be emptied over an appropriate trash receptacle. Alternatively, refuse chamber 172 may be provided as a disposable container that removably cooperates with cartridge 30 such that a full container can simply be removed and disposed of and the new container engaged with cartridge 30. Preferably, device 22 is configured to accommodate an amount of refuse associated with multiple cleaning routines although such capacity will understandably be a function of the degree of soiling associated with a given operating environment.

Still referring to FIG. 5, third cleaning device 114 is attached to frame 26 of floor cleaning device 22 and is positioned generally rearward of first cleaning device 110 and second cleaning device 112 relative to direction of travel 130. A cleaning cloth 188 is supported on a spool 190 that is supported by shaft 98. Cleaning cloth 188 passes about a tensioner assembly 192 and is recollected on a spool 194 supported by shaft 96. During use or operation of third cleaning system 114, controller 60 manipulates the position of tensioner 192 such that cleaning cloth 198 is directed away from shafts 96, 98 so as to engage the floor of operating area 24 (FIG. 4).

During operation, as the portion of cleaning cloth 188 positioned proximate tension assembler 192 becomes soiled, controller 60 initiates drive system 100 (FIG. 2) of third cleaning system 114 to advance cleaning cloth 188 from fresh material spool 192 to soiled material spool 194. When use of third cleaning system 114 is not desired, tensioner assembly 192 preferably retracts in an upward direction, indicated by arrow 200, such that the cleaning cloth 188 that extends across tensioner assembly 192 does not contact the floor surface underlying cleaning device 22 and the cleaning cloth is not advanced between spools 192, 194.

As shown in FIG. 6, third cleaning system 114 includes a cover 202 that is pivotably connected to housing 26 of floor cleaning device 22. Cover 202 cooperates with a latch assembly 204 that is pivotably connected to one of housing 26 and cover 202. Cover 202 allows a user to conveniently and expeditiously remove and/or replace spools 190, 194, associated with cleaning cloth 188.

Referring to FIG. 6, cartridge 30, which is associated with first cleaning system 110, preferably includes a pressurization system 182 that is fluidly connected to nozzles 120 and whose operation is controlled by controller 60. Cartridge 30 is constructed to slidably and removably cooperate with chamber 72 formed in frame 26 of floor cleaning device 22 such that nozzles 120 are directed in a downward and rearward direction relative to floor cleaning device 22 when cartridge 30 is engaged therewith. Such an orientation ensures that a majority of the dirt, dust, and debris, agitated by cartridge 30 is collected in chamber 172.

Figure 8:
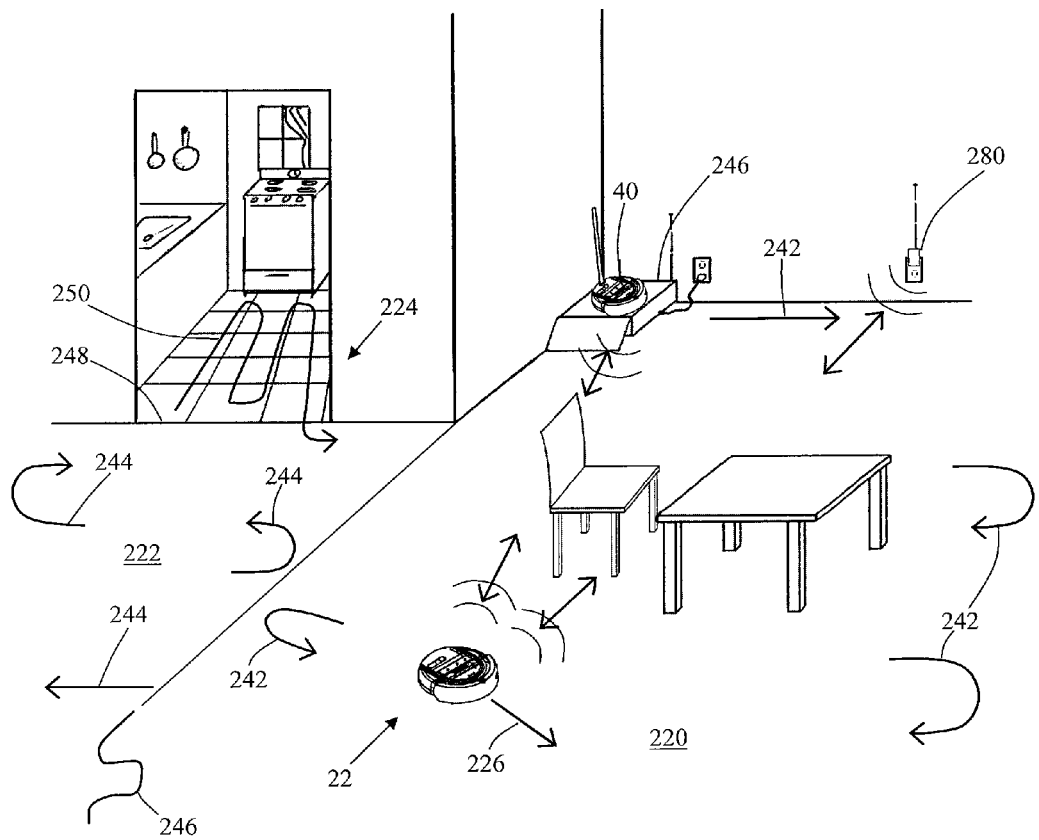
FIG. 8 is a view similar to FIG. 7 of the floor cleaning device during autonomous operation.

Each of cleaning systems 110, 112, 114 is operatively connected to controller 60 such that controller 60 can determine when each of respective cleaning systems 110, 112, 114 is to be engaged and/or operable. FIGS. 7-8 show an exemplary cleaning area or operating environment 24 associated with operation of floor cleaning device 22 and FIG. 9 shows an exemplary operation sequence associated with configured floor cleaning device 22 for individualized autonomous operation.

Referring to FIGS. 7 and 8, although not required, operating environment 24 commonly includes multiple distinct areas to be cleaned. For example, environment 24 may include a kitchen floor area 220, a common floor area 222, and a restroom or bathroom floor area 224. It is appreciated that each of areas 220, 222, 224 can include different flooring materials and/or is associated with environments that commonly require distinct cleaning solutions/operations. Such operations generally include defining which cleaning materials and/or solutions are applied thereto, the materials associated with application of the solutions, and/or the duration and amount of cleaning materials/solutions used during a given cleaning process. In order to ensure floor cleaning device 22 operates in accordance with a user specified cleaning procedure, floor cleaning device 22 is manually configurable or trainable to follow a desired cleaning path, indicated by arrows 226, and operate according to different floor cleaning procedures defined by operation of one or more of cleaning systems 110, 112, 114 and one or more of the cleaning operations associated with one or more of cleaning systems 110, 112, 114.

Figure 9:
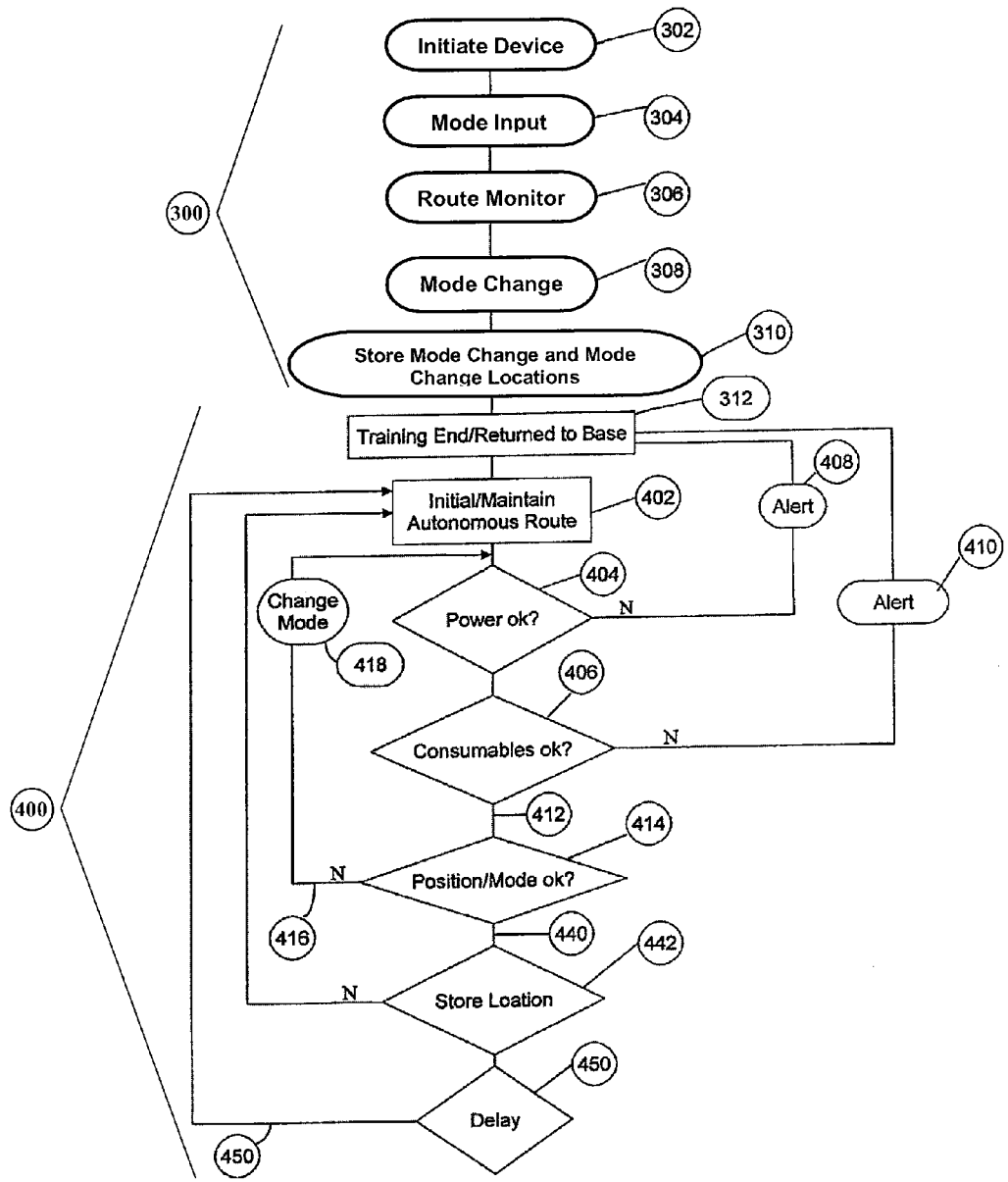
FIG. 9 is a flow chart that shows an exemplary training and subsequent automatic operation routine of the autonomous floor cleaning device shown in FIG. 1.

As shown in FIG. 7, when handle 40 is engaged with floor cleaning device 22, user interaction with inputs 43, 44, 46, 48 (FIG. 1), defines operation of floor cleaning device 22 in a training mode 300 (FIG. 9). In training mode 300, a user (not shown) manipulates the position of floor cleaning device 22 via interaction with handle 40 through a desired cleaning path 226 while avoiding obstacles 240. As a user transitions between areas 220, 222, 224 with floor cleaning device 22, the user specifies which of cleaning systems 110, 112, 114 is initiated and operated based on interaction with inputs 43, 44, 46, 48. Understandably, inputs 43, 44, 46, 48 can have labeling indicative of the area being cleaned (i.e. kitchen, bath, common/living areas, etc.), an indication of the cleaning application whose operation is associated therewith (i.e. touchless debris removal, sanitizer applicator, cloth cleaner, etc.), and/or an indication of the composition of the flooring material (i.e. wood, tile, composite, carpet, etc.). Understandably, controller 60 and database 64 could be preconfigured to associate a desired cleaning operation or modality based on any of the type of floor being cleaned, the use of the area being cleaned, etc.

An exemplary cleaning path of floor cleaning device 22 with respect to the environment 24 shown in FIGS. 7 and 8, would include a first cleaning path, indicated by arrow 242, wherein floor cleaning device 22 departs from a cradle or base station 246 and traverses the entirety of area 220. First cleaning path 242 terminates upon crossing of a transition 246 between area 220 and subsequent area 222. Commonly, a threshold is associated with transition 246. Preferably, device 22 is configured to accommodate the changes in elevation associated with the thresholds between different rooms or provided between different floor coving materials. Upon crossing transition 246, the user selects the cleaning system (s) 110, 112, 114 which are desirably associated with cleaning area 222 via interaction with one or more of inputs 43, 44, 46, 48. A second cleaning path 244 begins in alignment with first cleaning path 242 at the point of crossing transition 246. Floor cleaning device 22 is manually directed along second cleaning path 244 for cleaning of area 222.

Upon arrival at a second transition 248 between area 222 in area 224, user interaction with inputs 43, 44, 46, 48 associated with handle 40 configures cleaning device 22 to initiate operation of one or more of cleaning systems 110, 112, 114 within third cleaning area 224. Manual manipulation of cleaning device 22 through a third cleaning path 250 defines the autonomous cleaning path for cleaning of area 224. After all areas have been manually cleaned, a user can deactivate each of cleaning systems 110, 112, 114 and initiate a direct route return to base station 246. Alternatively, were floor cleaning device 22 provided with a replaceable power supply rather than a rechargeable configuration, the floor cleaning device 22 could be manually directed to a desired storage area until subsequent operation and/or use was desired. It is envisioned that the desired storage area can be power station and/or located at an unobtrusive location such as beneath or behind furniture or the like. When provided in a rechargeable format, it is appreciated that cleaning device 22 may return to a charging station or the like at intervals during a cleaning operation depending on the size of the area to be cleaned, the desired cleaning duration, and the capacity of the power source or battery. Preferably, device 22 is capable of continuous autonomous operation for durations of one to six or even more hours. Understandably, a more robust power source and/or operation in less power consuming cleaning modes will alter the duration of uninterrupted continuous autonomous operation of the cleaning device.

Upon completion of the cleaning route, user interaction with inputs 43, 44, 46, 48 defines the end of the cleaning routine. Alternatively, the end of the desired routine could be automatically determined by returning device 22 to base station 246. Having been trained and stored and/or returned to base station 246, floor cleaning device 22 is ready for autonomous multi-mode cleaning operations. Understandably, paths 242, 244, and 250 are merely exemplary of an expeditious cleaning routine. Furthermore, as training of floor cleaning device 22 occurs by manual manipulation of the device along the cleaning route, floor cleaning device 22 can readily avoid obstacles 240 or the like as such is required during manual manipulation of floor cleaning device 22 by a user.

Having been trained for autonomous operation, controller 60 initiates subsequent operation of floor cleaning device 22 through cleaning routes 242, 244, 250 and the associated cleaning modalities as previously defined by the user. The relatively compact nature of device 22 allows device 22 to conveniently maneuver around and under obstructions such as furniture, such as the table and chair shown in FIG. 8. Users can define the cleaning frequency via interaction with one or more of inputs 43, 44, 46, 48. Alternatively, the frequency of autonomous operation of device 22 could be predetermined at a given frequency such as a time of day, daily, weekly, more than once a week, etc.

Although controller 60 could be configured to assess the position of device 22 along paths 242, 244, 250 through monitoring of operation of each of drive systems 80, 82, device 22 preferably communicates with one of a base station 246 and/or a beacon 280 to assess the position of device 22 with respect to cleaning paths 242, 244, 250. Understandably, beacon 280 and or base station 246 could be configured to communicate with device 22 in any of infrared, ultrasonic, radio frequency identification, wireless local area network, and/or a wideband radio wave network. Preferably, the system includes at least two of these communication protocols to provide position assessment redundancy with respect to the operation of device 22. It is appreciated that beacon 280 could be provided as a plug in device or as a battery powered device. Furthermore, if beacon 280 is powered by the power system associated with the operating environments, it is envisioned that beacon 280 could also be configured to provide a recharging function for device 22 similar to base station 246. It is further envisioned that one or more beacons 280 could be provided in a manner that utilizes other powered devices associated with the operating environment and/or be provided with other functionality such as an air freshener or the like. For instance, beacon 280 could be integrated into a lamp at either of the plug or bulb location. If visible, it is envisioned that beacon 280 be provided with a fairly unobtrusive form factor.

As described above and as shown in FIG. 9, floor cleaning device 22 is operable in a training mode 300 and an autonomous mode 400. Training of device 22 initiates at step 302. User interaction with inputs 43, 44, 46, 48 defines the cleaning modality for a mode input 304 associated with a desired cleaning path. As the user translates device 22 through the desired path, controller 60, base station 246 and/or beacon 280 monitors and stores the mode and position information associated with the desired route 306. During training, device 22 is receptive to information related to changes in the operating mode 308 and the position of the device or mode change locations 310.

Upon returning to base station 246 and/or receiving a user signal associated with inputs 43, 44, 46, 40, device 22 terminates training sequence 300 at step 312. At step 312, device 22 has been trained for autonomous operation. Having been trained, autonomous cleaning operation 400, begins autonomous cleaning 402 via start-up or departure from base station 246. Device 22 periodically monitors power 404 and consumable levels 406. If either value is insufficient to complete the autonomous cleaning route, an indication or alert 408, 410 is generated and device 22 returns to base station 246 or the designated storage area. Preferably, when power monitoring, device 22 will suspend a cleaning operation to maintain enough power to perform the return to base station 246 operation having a minimum of power or nearly fully depleted power upon arrival at the base station.

Provided there is sufficient power and consumable materials necessary for beginning an autonomous cleaning path 412, device 22 monitors the position and the cleaning mode 414 as device 22 autonomously travels the previously trained cleaning path. As device 22 crosses one of transitions 246, 248, an inadequate mode signal 416 is generated such that the cleaning device changes the cleaning mode 418 to comply with operation of the cleaning devices associated with position acquired during training 300. The device continues along the trained path periodically altering the modes of operation as necessary as defined during training mode 300.

Once all of the trained position and cleaning mode criteria have been satisfied 420, device 22 returns to base station 246 and/or an other storage position 442. Device 22 remains inactive until completion of a delay 450 that is preselected during training 300 and/or defined by controller 60. Upon completion of delay 450, device 22 begins a subsequent autonomous cleaning operation in accordance with procedure 400. Understandably, one or more of inputs 43, 44, 46, 48 could provide an interrupt for either of training procedure 300 or autonomous cleaning procedure 400 such that device 22 can be configured and/or reconfigured to provide a desired cleaning path and efficacy. For example, where certain spaces of area 24 require greater attention, or more passes of device 22 to attain the desired level of cleanliness, a user can train device 22 to provide a desired number of passes or reduced travel speed over more heavily soiled areas. Such a configuration minimizes the potential of needing to touch up areas that have already been cleaned.

Figure 10:
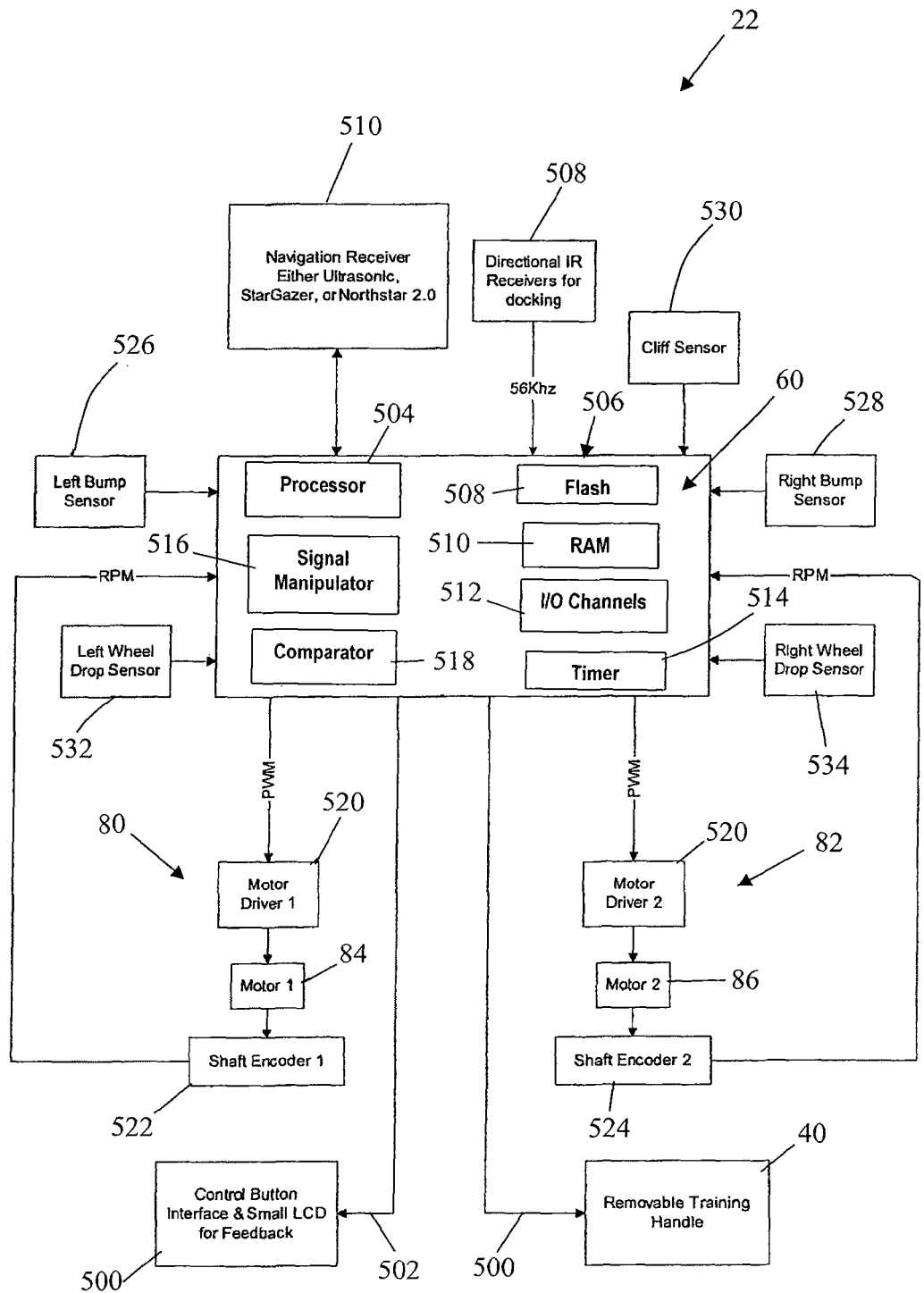
FIG. 10 is a graphical representation of an autonomous device according to the present invention.

FIG. 10 shows is a graphical representation of device 22 according to the present invention. As described further below with respect to FIGS. 10-16, device 22 includes a navigation protocol that allows the device to quickly and efficiently traverse an area to be cleaned. As shown in FIG. 10, controller 60 is in communication with one or more user inputs 500, 502 configured for communication with a user. Controller 60 includes a processor 504, and one or more memory devices 506. Preferably, memory device 506 includes a flash memory portion 508 and a random access memory (RAM) 510 memory portion. Memory device 506 is configured to contain and allow access to user trained cleaning protocols. Controller 60 also preferably includes one or more input/output channels 512, one or more timers 514, one or more signal manipulators 516 such as pulse width modulation modules (PWM), and one or more comparators 518 or units configured to capture and compare information received from various sensors and/or detectors that are in communication with controller 60 of device 22 as described further below.

Each drive system 80, 82 is connected to controller 60 and includes a driver 520 that is connected to a respective motor 84, 86. The operation of each motor 84, 86 is monitored via a detector or sensor such as a shaft encoder 522, 524 such that travel and position information, such as the speed of operation of each motor 84, 86, can be communicated to controller 60. Controller 60 is also preferably in communication with left and right bump sensors 526, 528 which provide unexpected obstacle detection. Controller 60 is also in communication with an optional cliff sensor 530, and left and right drop sensors 532, 534 that can provide an indication of an unintended change in elevation in a work area. Preferably, sensors 530, 532, 534 are configured to alter the direction of operation of device 22 prior to interaction with an undesired elevation change. Controller 60 is also in communication with one or more wireless positioning systems 508, 510. Preferably, position system 508 is provided in an infrared (IR) communication platform that includes one or more direction IR receivers that are oriented and positioned to orient device 22 for interaction with a docking unit or station 246. Positioning system 510 is also wireless in nature and configured to determine an orientation and position of device 22 relative to the operating environment.

Understandably, although position systems 508, 510 are shown as separate systems, it is envisioned that systems 508, 510 could be integrated in a common platform and configured to allow communication over a switched common channel. It is further envisioned that device 22 rely solely on the positional navigation described below with respect to the operation of drive systems 80, 82 although the position assessment redundancy provided by the combination of encoders 522, 524 and positioning systems 508, 510 provides a cost effective navigation system that is less susceptible to navigation stack errors that prove problematic with other autonomous devices. Such stack errors are frequently evident in the device becoming "lost" within a work area such that the operation of the device does not proceed as intended or desired. Such operation yields inefficient operation of such devices.

As described above, as device 22 is manually manipulated around the floor or area of intended operation, device 22 records its path, which can subsequently be played back in an autonomous nature. Controller 60 uses both wheel odometry on the ground, associated with shaft encoders 522, 524, and a supplemental positioning system, one or more of positioning systems 508, 510, to determine position during record and playback. One exemplary system of positioning system 510 is an indoor positioning system that utilizes an ultrasonic beacon, and two ultrasonic ears, to triangulate a position to a beacon in a work area. As described further below, the inputs associated with the various position acquisition systems, are combined or fused together using a Kalman filter, to estimate the instantaneous position of device 22. Sensors 526, 528 provide information regarding whether device 22 has experienced an impact and may therefore no longer be at a desired position with respect to the trained travel routine.

With respect to the navigation of device 22, information associated with two coordinate systems, X/Y coordinates in terms of where the odometry attained by shaft encoders 522, 524 believe device 22 is located, and X/Y coordinates in terms of where positioning systems 508 or 510 believe device 22 is located, is communicated to controller 60. The information associated with each coordinate positioning system is used to determine the position and orientation of the device 22 with respect to the work area.

Figure 11:
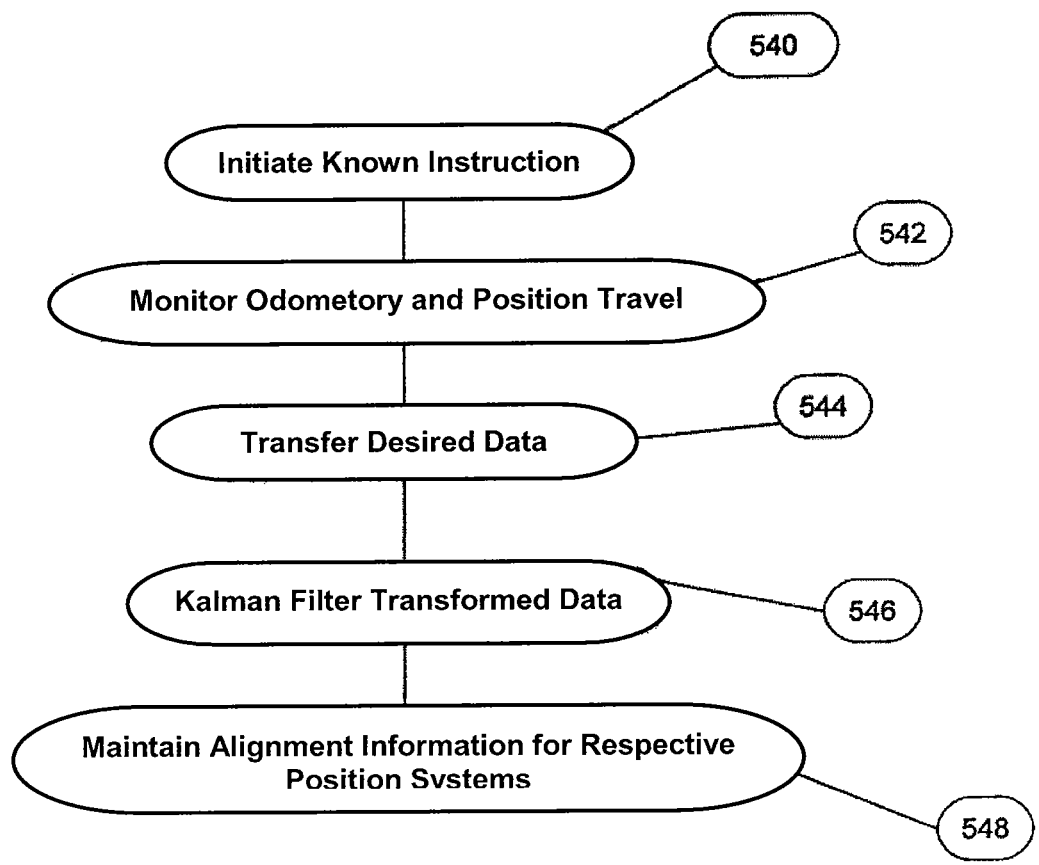
FIG. 11 is a flow chart showing a schematic representation of a navigation system for use with the device show in FIG. 10.

One method envisioned for assessing the orientation of device 22 is shown in FIG. 11. An orientation initiation instruction 540 initiates a calibration operation of device 22. Preferably, initiation instruction 540 generates an instruction to move device 22 relative to a given position in a predetermined direction and distance. Preferably, the calibration instruction is a known linear forward/reverse drive instruction. During the forward and rearward travel, controller 60 monitors position and orientation information 542 acquired with each of the respective coordinate position systems. Controller 60 transforms the desired data 544 and derives a translation/rotation matrix function that orients the two coordinate position systems relative to one another. As described further below, the information attained from each coordinate position system undergoes a coordinate transform function that is communicated to a Kalman filter 546 thereby generally aligning the coordinate information attained by each of the respective coordinate position systems. Controller 60 maintains and periodically monitors real-time position information that may need to be altered by the alignment information such that the position of device 22 can be assessed with each ordinate system during autonomous operation of device 22. As described further below, the operation of controller 60 increases the likelihood that device 22 is in a preferred orientation as it traverses the work area while allowing for periodic changes in direction due to unexpected changes in the operating area.

Once device 22 has been trained and calibrated, it can accurately and autonomously repeat a desired travel and operation modality with allowed deviations for unexpected obstructions, consumable refueling, and/or other unexpected occurrences associated with performing the trained autonomous operation. Those skilled in the art will appreciate that the positional information must be accurately maintained during both the acquisition and playback modes. Furthermore, the accuracy of the position and orientation information will directly affect the ability of device 22 to autonomously repeat the intended, desired, or trained travel operation. That is, controller 60 must be able to accurately determine the position and orientation of device 22 during both training and autonomous operation to effectuate repeat operation of device 22 in accordance with the trained routine. During either training or autonomous operation, device 22 could be bumped, twisted, picked up, or otherwise inadvertently translated from a desired operational path. The odometry data and data from an indoor positioning system, such as system 510 is combined or otherwise fused together using a generally inexpensive method that can be accomplished using noncomplex and therefore generally inexpensive computing hardware.

Regardless of the hardware configuration of controller 60, preferably device 22 operates in a travel methodology that determines the orientation and position of device 22 for alignment with subsequent nodes or waypoints along a desired or trained travel path. As device 22 approaches respective nodes along the travel path, controller 22 effectuates a tangent arc pursuit as described further below to effectuate a desired orientation of device 22 as it attains respective navigational nodes. Testing has shown that device 22 need not rigidly adhere to the trained cleaning path to provide acceptable cleaning performance and satisfy user expectations.

Figure 12:
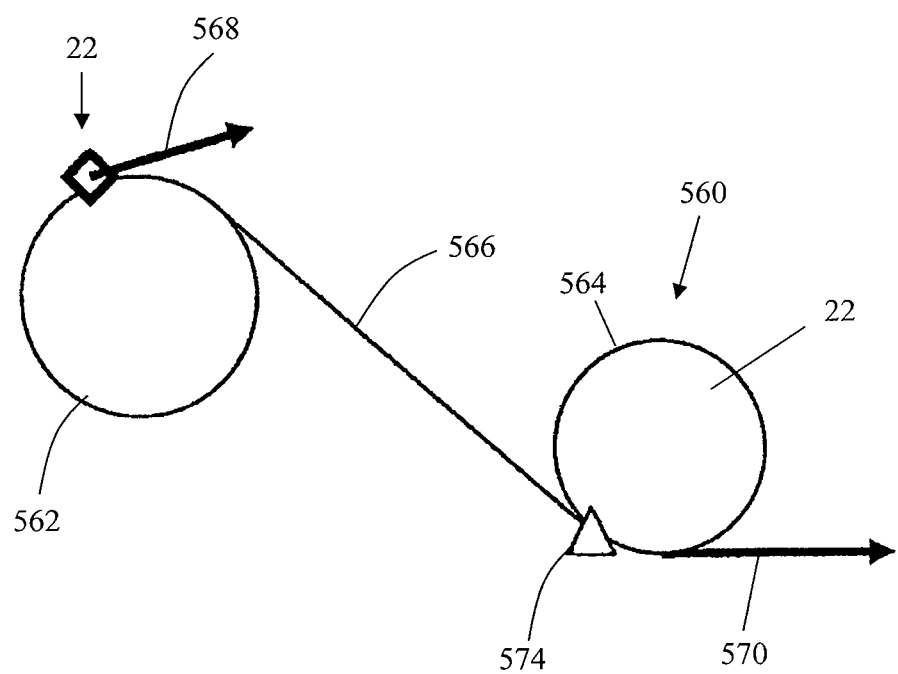
FIG. 12 is a graphical representation of an arc tangent pursuit navigation protocol associated with the navigation system shown in FIG. 11.

In a general sense, as shown graphically in FIG. 12, the tangent arc pursuit navigation planning algorithm allows device 22 to follow a pre-recorded path in a manner that is reliable and wherein the robot preferably arrives at one or more of the nodes or waypoints 560 along a desired travel path in an orientation that approximates, or is the same as, the orientation of device 22 at the same node during training. In a graphical sense, during tangent arc pursuit navigation, device 22 draws a minimum radius circle 562 about the device, a minimum radius circle 564 around an intended subsequent travel path position waypoint 560, and "looks-ahead" so as to derive how the two circles overlap. Controller 60 determines if a path 566 that is tangent to each of the minimum radius circle 562 about the device and the minimum radius circle 564 about a forthcoming waypoint 560 is reachable so as to generate a travel plan that mimics, and/or can recover to, the trained travel path. By "looking-ahead" to various travel waypoints along the trained path, controller 60 allows for one or more synchronization points to be picked out of a recorded or desired travel path, and thereby plan for the tangents of the planning circles to overlap so that device 22 attains a desired orientation at respective waypoints along the travel path. Controller 60 and the tangent arc pursuit operation of device 22 allows device 22 to travel along a pre-trained travel route in a manner that can accommodate periodic and changing position obstructions. As shown in FIG. 12, device 22 travels along a tangent 566 between minimum radius circle 562 and minimum radius circle 564 so that a travel vector 568 of device 22 arrives at waypoint 560 in a manner that allows alignment of the travel vector 568 and a respective waypoint vector 570.

Controller 60 utilizes information about the minimum turning radius of device 22 and operational and execution tolerances to generate an effective turning radius of device 22. In a preferred implementation, controller 60 chooses a forthcoming waypoint 560 with which device 22 intends to come into alignment and determines device vector 568 and retrieves waypoint vector 570. Controller 60 then generates circles 562, 564 that are tangent to the device and waypoint vectors 568, 570. Controller 60 determines a point of bearing 574 associated with aligning tangent travel path 566 and waypoint vector 570. Preferably, controller 60 determines the location of the point of bearing for every iteration of a steering loop control.

Figure 13:
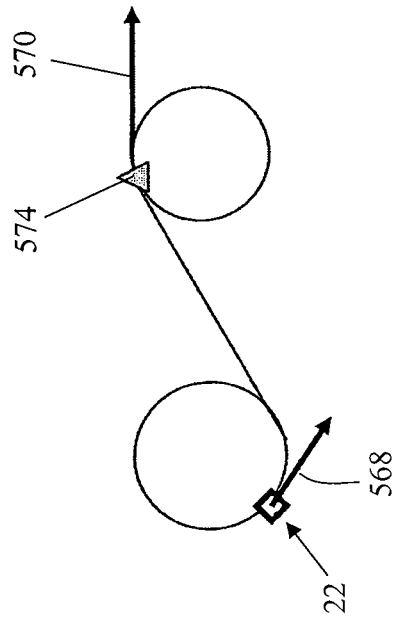
FIGS. 13-16 show various steering correction and alignment scenarios that may occur and be overcome by the navigation system shown in FIG. 11.
Figure 15:
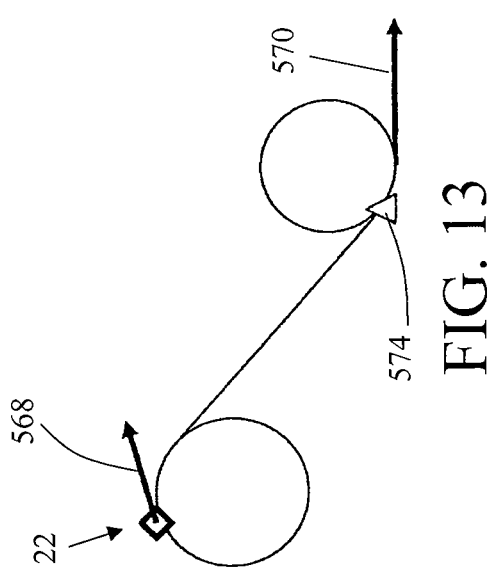
Figure 14:
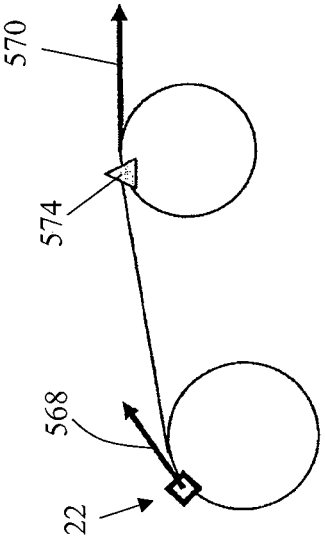
Figure 16:
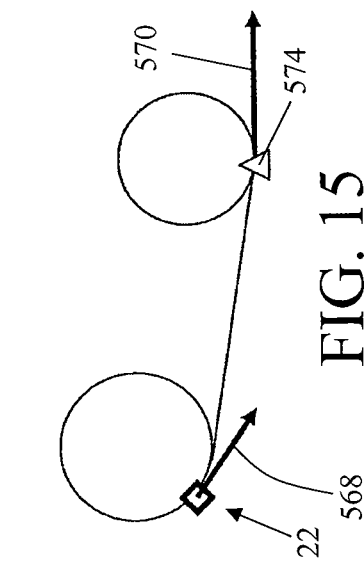

FIGS. 13-16 show various alternative circle and tangent orientations solutions that can be experienced during the travel of device 22 and the alignment with subsequent waypoint bearing points 574. FIGS. 13 and 16 show various orientation associations wherein clockwise turning of device 22 results in the most expedient alignment of device vector 568 and waypoint vector 570. Conversely, FIGS. 14 and 15 show positional orientations that may occur wherein counterclockwise rotation results in the most expedient alignment of the device vector 568 and the waypoint vector 570. During operation, each device vector 568 may have more than one alignment solution with respect to a forthcoming waypoint vector 570. Controller 60 is preferably configured to select the most expedient device/waypoint alignment solution associated with the various solution alternatives shown in FIGS. 13-16. Understandably, unexpected or unintended obstructions may also effect the solution as to determining the most expedient travel/turning direction for device 22.

Controller 60 is also configured to tolerate waypoint recovery or skipping. For example, if device 22 initiates an operation cycle from a position very near a desired waypoint, and extensive manipulation of device 22 would be required to alignment of the device and waypoint vectors 568, 570, controller 60 can be configured to allow bypass of a respective waypoint. Understandably, during such operation, device 22 would attempt to attain alignment with a subsequent waypoint vector. Similarly, if device 22 attains a position that is beyond a desired waypoint, or in such near proximity to a waypoint that a severe slope of tangent line 566 would be required to achieve alignment with the forthcoming waypoint vector 570, controller 60 may be configured with a hierarchical paradigm that allows skipping of difficult or unattainable waypoint vector alignments.

It is envisioned that device 22 can be equally configured to allow the user to define or individualize important or waypoints that are preferably not skipped. Preferably, user definition of an unpassable waypoint vector position are addressed by device 22 attaining alignment of the vehicle and waypoint vectors 568, 570 independent of the respective difficulties of over turn operations discussed above with respect to FIGS. 13-16. Alternatively, it is envisioned that, if an unpassable waypoint is going to be missed, that controller 60 override the arc tangent pursuit navigation and provide a recovery pursuit instruction wherein device 22 is free to move in directions and speeds beyond the trained operating conditions and within achievable rotational directions, to attain alignment with an unpassable waypoint vector 570. Preferably, after device 22 has achieved alignment with an unpassable waypoint, device 22 is configured to automatically resume pursuit of subsequent waypoints. Understandably, such operation is only one unpassable waypoint recovery protocol. For instance, device 22 could be configured to return to missed waypoints at later times during a respective operation cycle.

Another navigation protocol envisioned for controller 60 is a tangential spiral arc steering function. Such systems are common to automotive and railroad road and track layout and provide tangential spiral easements on curve entrance and exits. Such transitions reduce the angular accelerations associated with entering and exiting turns. Although such a system would require controller 60 to determine the spiral associated with the desired travel path of device 22, it is envisioned that by enlarging the margin associated with the minimum radius circle of device 22 and waypoint 574 so as to approximate the space associated with the spiral travel, the control of device 22 could be provided with a combination of arc tangent/spiral tangent navigation.

Cleaning device 22 provides for autonomous cleaning of environments wherein multiple cleaning modalities may be desired. Providing a cleaning device with multiple selectively operable modalities provides a highly versatile cleaning apparatus. Furthermore, allowing a user to define the path and cleaning modality associated with autonomous operation of the device further increases the applicability of the device as well as the ability of the device to satisfy individual specific cleaning requirements.

Therefore, a floor cleaning device that autonomously traverses an area to be cleaned according to one embodiment of the invention includes a drive mechanism that is attached to a housing and which propels the floor cleaning device across a floor. The device includes a controller that is in communication with the drive mechanism and controls movement of the floor cleaning device across the floor. The controller has a training mode wherein manual user manipulation of the floor cleaning device defines a cleaning route and a cleaning mode wherein the controller initiates the cleaning route automatically. Such a cleaning device can be expeditiously tailored to meet individual expectations.

Another embodiment of the invention usable with one or more of the aspects above includes a method of controlling operation of a floor cleaning device that is configured for autonomous operation. The method includes training the floor cleaning device with a cleaning route by manually manipulating the floor cleaning device through the cleaning route and automatically initiating the cleaning route at selected intervals after the floor cleaning device has been trained.

A further embodiment of the invention usable with one or more of the aspects of the above embodiments includes an autonomous cleaning device that includes a first cleaning system and a second cleaning system that are supported by a frame. The first and second cleaning systems are operable in first and second dissimilar cleaning modes. The device includes a controller that is configured to control operation of the autonomous cleaning device and initiate operation of the first cleaning system for a first cleaning path and initiate operation of the second cleaning system for a second cleaning path.

Although specific embodiments of the present invention have been described in detail, it should be understood that this description is merely for purposes of illustration. Many modifications and variations to the specific embodiments will be apparent to those skilled in the art, which will be within the scope of the invention. Therefore, the invention should not be limited to the described embodiments. The above describes the preferred embodiment of the invention whose specific configuration is not intended to limit the scope of the appending claims.

What is claimed is:

1. A floor cleaning device that autonomously traverses an area to be cleaned, the floor cleaning device comprising:
  a housing;
  a drive mechanism attached to the housing for propelling the floor cleaning device across a floor; and
  a controller in communication with at least one sensor and with the drive mechanism for controlling movement of the floor cleaning device across the floor, the controller having a training mode wherein manual user manipulation of the floor cleaning device defines a cleaning route and alternate cleaning modes defined by operation of alternate cleaning apparatus supported by the floor cleaning modes wherein the controller initiates the cleaning route and respective cleaning modes automatically, and automatically deviates from the cleaning route and returns to the cleaning route, in response to signals from the at least one sensor to avoid unexpected obstructions that would result in unacceptable changes in elevation of the work area.

2. The floor cleaning device of claim 1 further comprising a memory storage device for retaining the cleaning route.

3. The floor cleaning device of claim 1 further comprising more than one cleaning apparatus wherein each cleaning apparatus is associated with at least one of a plurality of floor materials.

4. The floor cleaning device of claim 3 further comprising an input that is selectable by the user to associate a cleaning apparatus with a cleaning route.

5. The floor cleaning device of claim 3 wherein the alternate cleaning apparatus is associated with one of a touchless cleaning system and a replaceable cleaning member respectively.

6. The floor cleaning device of claim 3 wherein at least one of the more than one floor cleaning apparatus includes a number of cleaning solutions that are one of replaceable or refillable.

7. The floor cleaning device of claim 1 wherein the controller is configured to initiate operation of selected components of a cleaning apparatus with respect to a first floor surface and initiate operation of other selected components of the respective cleaning apparatus with respect to a second floor surface.

8. The floor cleaning device of claim 1 further comprising a navigation system in communication with the controller for determining a position of the floor cleaning device relative to the area to be cleaned.

9. The floor cleaning device of claim 8 wherein the navigation system further comprises at least one of a communication system that wirelessly communicates between the floor cleaning device and a beacon, a beacon that is locally positioned relative to the floor cleaning device, and the navigation system is configured to communicate with one of a global positioning system that is remote from the area to be cleaned and a wireless fidelity (Wi-Fi) system associated with the area to be cleaned.

10. The floor cleaning device of claim 1 wherein the controller further comprises a power management system configured to interrupt the cleaning route to return the floor cleaning device to a cradle when a power system of the floor cleaning device is inadequately powered to continue the current cleaning route and return the floor cleaning device to a cradle.

11. The floor cleaning device of claim 8 wherein the controller is configured to receive waypoint information during the training mode and determine a tangent arc line between the position of the floor cleaning device relative to the area to be cleaned at a given instance and an adjacent waypoint during the automatic operation of the floor cleaning device along the cleaning route.

\* \* \* \* \*